(12) United States Patent
Wang

(10) Patent No.: US 12,387,655 B2
(45) Date of Patent: Aug. 12, 2025

(54) ZFRAME DATA DISPLAY METHOD, ELECTRONIC DEVICE, AND STORAGE MEDIUM

(71) Applicant: Honor Device Co., Ltd., Shenzhen (CN)

(72) Inventor: Yufei Wang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/269,691

(22) PCT Filed: Dec. 26, 2022

(86) PCT No.: PCT/CN2022/142074
§ 371 (c)(1),
(2) Date: Jun. 26, 2023

(87) PCT Pub. No.: WO2023/160209
PCT Pub. Date: Aug. 31, 2023

(65) Prior Publication Data
US 2024/0404452 A1   Dec. 5, 2024

(30) Foreign Application Priority Data
Feb. 28, 2022  (CN) .......................... 202210190653.5

(51) Int. Cl.
*G09G 3/20* (2006.01)
*G06T 5/60* (2024.01)
(Continued)

(52) U.S. Cl.
CPC .............. *G09G 3/2096* (2013.01); *G06T 5/60* (2024.01); *G06T 5/92* (2024.01); *G06T 7/90* (2017.01);
(Continued)

(58) Field of Classification Search
CPC .. G09G 5/10; G09G 5/02; G09G 3/20; H04N 23/667; H04N 23/76; H04N 23/63; H04N 23/951; H09G 234/06
See application file for complete search history.

(56) References Cited

U.S. PATENT DOCUMENTS 9,589,313 B2 * 3/2017 Wallace .................... G06T 1/20
10,249,263 B2    4/2019 Hendry et al.
(Continued)

FOREIGN PATENT DOCUMENTS

CN    107690811 A    2/2018
CN    109544463 A    3/2019
(Continued)

*Primary Examiner* — Olga V Merkoulova
(74) *Attorney, Agent, or Firm* — Slater Matsil, LLP

(57) ABSTRACT

A method includes: obtaining HDR frame data of SDR frame data in response to an operation instruction generated by switching of a frame data display scenario; obtaining picture parameters of the SDR frame data and the HDR frame data; calculating a difference between the picture parameter of the SDR frame data and the picture parameter of the HDR frame data; determining a switching amplitude of an HDR display effect, a quantity of switching times, and a quantity of frames for each time of switching of the HDR display effect based on the difference; and performing multi-frame switching to display the SDR frame data as the HDR frame data through transition based on the switching amplitude of the HDR display effect, the quantity of switching times, and the quantity of frames for each time of switching of the HDR display effect.

20 Claims, 12 Drawing Sheets

(51) Int. Cl.
  *G06T 5/92* (2024.01)
  *G06T 7/90* (2017.01)
(52) U.S. Cl.
  CPC ............... *G06T 2207/10016* (2013.01); *G06T 2207/10024* (2013.01); *G06T 2207/20021* (2013.01); *G06T 2207/20081* (2013.01); *G06T 2207/20084* (2013.01); *G06T 2207/20208* (2013.01); *G09G 2320/0247* (2013.01); *G09G 2320/066* (2013.01); *G09G 2340/0428* (2013.01)

(56) References Cited

U.S. PATENT DOCUMENTS

| | | | | |
|---|---|---|---|---|
| 10,536,663 | B2* | 1/2020 | Sakurai | H04N 7/007 |
| 10,652,593 | B2* | 5/2020 | Toma | H04N 21/23418 |
| 10,917,583 | B2 | 2/2021 | Baar et al. | |
| 10,928,562 | B2* | 2/2021 | Zhang | G02F 1/133605 |
| 11,086,183 | B2* | 8/2021 | Wu | G02F 1/155 |
| 11,218,742 | B2* | 1/2022 | Toma | H04N 21/23614 |
| 11,438,523 | B2* | 9/2022 | Nashizawa | H04N 23/76 |
| 11,683,539 | B2* | 6/2023 | Toma | H04N 21/2343 |
| | | | | 382/299 |
| 11,869,450 | B2* | 1/2024 | Zhang | G09G 3/3413 |
| 11,997,325 | B2* | 5/2024 | Toma | H04N 21/4402 |
| 2015/0042890 | A1* | 2/2015 | Messmer | H04N 9/68 |
| | | | | 348/725 |
| 2016/0205370 | A1* | 7/2016 | Wallace | H04N 5/20 |
| | | | | 348/571 |
| 2017/0366794 | A1* | 12/2017 | Yahata | H04N 9/8042 |
| 2018/0082661 | A1 | 3/2018 | Kang et al. | |
| 2018/0204542 | A1 | 7/2018 | Saito | |
| 2018/0213265 | A1* | 7/2018 | Toma | H04N 21/2343 |
| 2018/0330674 | A1 | 11/2018 | Baar et al. | |
| 2019/0052833 | A1* | 2/2019 | Sakurai | H04N 5/38 |
| 2019/0080440 | A1 | 3/2019 | Eriksson et al. | |
| 2019/0346594 | A1* | 11/2019 | Zhang | G02B 5/0226 |
| 2020/0236407 | A1* | 7/2020 | Toma | H04N 21/23614 |
| 2020/0355973 | A1* | 11/2020 | Wu | G02F 1/133601 |
| 2020/0404153 | A1 | 12/2020 | Nishiguchi | |
| 2021/0250518 | A1* | 8/2021 | Nashizawa | H04N 23/667 |
| 2022/0086510 | A1* | 3/2022 | Toma | G06T 5/90 |
| 2023/0169932 | A1* | 6/2023 | Zhang | G09G 5/10 |
| | | | | 345/87 |
| 2023/0276083 | A1* | 8/2023 | Toma | H04N 21/4854 |
| | | | | 382/299 |

FOREIGN PATENT DOCUMENTS

| | | |
|---|---|---|
| CN | 110415634 A | 11/2019 |
| CN | 106657714 A | 5/2020 |
| CN | 107154059 A | 8/2020 |
| CN | 108090879 A | 11/2020 |
| CN | 113225475 A | 8/2021 |
| CN | 113706412 A | 11/2021 |
| CN | 113784175 A | 12/2021 |

* cited by examiner

ZFRAME DATA DISPLAY METHOD, ELECTRONIC DEVICE, AND STORAGE MEDIUM

CROSS-REFERENCE TO RELATED APPLICATIONS

This application is a national stage of International Application No. PCT/CN2022/142074 filed on Dec. 26, 2022, which claims priority to Chinese Patent Application No. 202210190653.5 filed on Feb. 28, 2022. The disclosures of both of the aforementioned application are hereby incorporated by reference in their entireties.

TECHNICAL FIELD

This application relates to the field of display technologies, and in particular, to a frame data display method, an electronic device, and a storage medium.

BACKGROUND

With the development of intelligent electronic devices such as smartphones and personal computers, there is an increasingly high requirement for video and image display quality. For example, when a video or an image is displayed in a high-dynamic range (High-Dynamic Range, HDR), display quality can be improved. In a scenario in which an image is switched from being displayed in a standard dynamic range (Standard Dynamic Range, SDR) to being displayed in an HDR, switching is usually completed by using one frame of image. However, because there is a difference between an SDR image and an HDR image in terms of a visual effect, if the SDR image is switched to the HDR image by using one frame of image, transition of the visual effect is not smooth enough, and display of the image is prone to jump or flicker, thereby affecting viewing experience of a user.

SUMMARY

In view of the foregoing content, it is necessary to provide a frame data display method, an electronic device, and a storage medium, so that an HDR display effect can be smoothly transitioned, and jump or flicker in display of HDR frame data is avoided.

According to a first aspect, this application provides a frame data display method. The method includes: obtaining HDR frame data of SDR frame data in response to an operation instruction generated by switching of a frame data display scenario; obtaining picture parameters of the SDR frame data and the HDR frame data; calculating a difference between the picture parameter of the SDR frame data and the picture parameter of the HDR frame data; determining a switching amplitude of an HDR display effect, a quantity of switching times, and a quantity of frames for each time of switching of the HDR display effect based on the difference; and performing multi-frame switching to display the SDR frame data as the HDR frame data through transition based on the switching amplitude of the HDR display effect, the quantity of switching times, and the quantity of frames for each time of switching of the HDR display effect. According to the foregoing technical solution, in a process of switching the frame data from SDR display to HDR display, the HDR display effect can be divided into a plurality of frames for switching based on a variable of the picture parameter, so that jump or flicker in display of the HDR frame data is avoided.

In a possible implementation, the method further includes: monitoring, in real time, whether the frame data causes preset display scenario switching; and generating the operation instruction if it is detected that the frame data causes the preset display scenario switching. According to the foregoing technical solution, the frame data may be displayed in an HDR based on a scenario requirement, to optimize a visual effect of a user.

In a possible implementation, the preset display scenario switching is to switch the frame data from small-window display to full-screen display or to switch a user interface of a display to a preset application interface. According to the foregoing technical solution, the frame data may be displayed in an HDR in a scenario with a high requirement for display, to optimize the visual effect of the user.

In a possible implementation, the obtaining HDR frame data of SDR frame data includes: performing dynamic range expansion on the SDR frame data to obtain the HDR frame data. According to the foregoing technical solution, a dynamic range of the frame data may be expanded, to optimize a display effect of the frame data.

In a possible implementation, the performing dynamic range expansion on the SDR frame data to obtain the HDR frame data includes: performing inverse hue mapping on the SDR frame data to expand a dynamic range of the SDR frame data, to obtain the HDR frame data. According to the foregoing technical solution, the dynamic range of the frame data can be accurately expanded.

In a possible implementation, the performing dynamic range expansion on the SDR frame data to obtain the HDR frame data includes: inputting the SDR frame data into a pre-trained dynamic range expansion model, to obtain the HDR frame data. According to the foregoing technical solution, the dynamic range of the frame data can be intelligently expanded, so that the dynamic range of the frame data obtained through expansion meets a user requirement.

In a possible implementation, a type of the picture parameter includes at least one of contrast, saturation, or hue. According to the foregoing technical solution, the HDR display effect may be implemented from picture parameters in a plurality of dimensions.

In a possible implementation, the obtaining picture parameters of the SDR frame data and the HDR frame data includes: dividing the SDR frame data and the HDR frame data into a plurality of partitions; and calculating an APL value of each partition in the SDR frame data and the HDR frame data. According to the foregoing technical solution, a contrast difference between the frame data before and after HDR processing can be accurately calculated.

In a possible implementation, the calculating an APL value of each partition in the SDR frame data and the HDR frame data includes: calculating an APL value of each partition based on a grayscale value of each pixel in each partition and a quantity of pixels. According to the foregoing technical solution, contrast of each partition in the frame data can be accurately calculated.

In a possible implementation, the obtaining picture parameters of the SDR frame data and the HDR frame data includes: dividing the SDR frame data and the HDR frame data into a plurality of partitions; and calculating saturation or hue of each partition in the SDR frame data and the HDR frame data. According to the foregoing technical solution, a saturation or hue difference of the frame data before and after HDR processing can be accurately calculated.

In a possible implementation, the calculating saturation or hue of each partition in the SDR frame data and the HDR frame data includes: calculating the saturation or the hue of each partition based on an RGB value of each pixel in each partition in the SDR frame data and the HDR frame data. According to the foregoing technical solution, the saturation or the hue of each partition in the frame data can be accurately calculated.

In a possible implementation, the calculating a difference between the picture parameter of the SDR frame data and the picture parameter of the HDR frame data includes: calculating a difference of at least one type of picture parameter between every two partitions at a same location in the SDR frame data and the HDR frame data; and determining that a maximum value in a plurality of calculated differences is the difference between the picture parameter of the SDR frame data and the picture parameter of the HDR frame data. According to the foregoing technical solution, a picture parameter difference before and after HDR processing can be accurately determined.

In a possible implementation, the determining a switching amplitude of an HDR display effect, a quantity of switching times, and a quantity of frames for each time of switching of the HDR display effect based on the difference includes: dividing the difference into a preset quantity of equal parts to obtain the switching amplitude of the HDR display effect and the quantity of switching times; and setting the quantity of frames for each time of switching of the HDR display effect. According to the foregoing technical solution, a picture parameter difference before and after HDR processing may be divided into a plurality of parts, so that the picture parameter is adjusted by using a plurality of frames, and the HDR display effect is smoothly transitioned.

In a possible implementation, the performing multi-frame switching to display the SDR frame data as HDR frame data through transition based on the switching amplitude of the HDR display effect, the quantity of switching times, and the quantity of frames for each time of switching of the HDR display effect includes: delivering the switching amplitude of the HDR display effect, the quantity of switching times, and the quantity of frames for each time of switching of the HDR display effect to a display driver module through a dimming interface; and driving, by the display driver module based on the switching amplitude of the HDR display effect, the quantity of switching times, and the quantity of frames for each time of switching of the HDR display effect, a display to perform multi-frame switching to display the SDR frame data as the HDR frame data through transition. According to the foregoing technical solution, switching of the HDR display effect can be quickly implemented by using a specially disposed dimming interface.

In a possible implementation, the driving, by the display driver module, a display to perform multi-frame switching to display the SDR frame data as the HDR frame data through transition includes: each time frame data of the quantity of frames is displayed, driving, by the display driver module, the display to switch the HDR display effect once for the frame data based on the switching amplitude; and performing multi-frame switching to display the SDR frame data as the HDR frame data when switching of the HDR display effect reaches the quantity of switching times. According to the foregoing technical solution, a picture parameter difference before and after HDR processing may be divided into a plurality of parts, so that the picture parameter is adjusted by using a plurality of frames, and the HDR display effect is smoothly transitioned.

In a possible implementation, the driving, by the display driver module, a display to perform multi-frame switching to display the SDR frame data as the HDR frame data through transition includes: if there are at least two types of picture parameters, displaying the SDR frame data of a preset quantity of frames; separately delivering, by the dimming interface, switching amplitudes of a plurality of HDR display effects, a quantity of switching times, and a quantity of frames for each time of switching of the HDR effect to the display driver module; each time frame data of the quantity of frames is displayed, driving, by the display driver module, the display to switch the HDR effect once for the frame data based on the switching amplitudes of the plurality of HDR display effects; and performing multi-frame switching to display the SDR frame data as the HDR frame data when switching of the HDR display effect reaches the quantity of switching times. According to the foregoing technical solution, in a process of switching the frame data to be displayed in an HDR, adjustment of picture parameters of different types may be performed synchronously, to optimize the HDR display effect.

In a possible implementation, the driving, by the display driver module, a display to perform multi-frame switching to display the SDR frame data as the HDR frame data through transition includes: driving, by the display driver module based on the switching amplitude of the HDR display effect, the quantity of switching times, and the quantity of frames for each time of switching of the HDR display effect, the display to perform multi-frame switching to perform linear adjustment or non-linear adjustment on the picture parameter of the SDR frame data, to display the SDR frame data as the HDR frame data. According to the foregoing technical solution, the HDR display effect of the frame data may be adjusted based on different requirements or scenarios, to optimize viewing experience of the user.

According to a second aspect, this application provides an electronic device. The electronic device includes a memory and a processor, the memory is configured to store program instructions, and the processor is configured to read and execute the program instructions stored in the memory. When the program instructions are executed by the processor, the electronic device is enabled to perform the foregoing frame data display method.

According to a third aspect, this application provides a computer storage medium. The computer storage medium stores program instructions, and when the program instructions are run on an electronic device, the electronic device is enabled to perform the foregoing frame data display method.

In addition, for technical effects brought by the second aspect and the third aspect, refer to the related descriptions of the method in the designs of the method part. Details are not described herein again.

According to the frame data display method, the electronic device, and the storage medium that are provided in embodiments of this application, a picture parameter variable for implementing an HDR display effect may be determined based on frame data before and after HDR processing, and then the picture parameter variable is divided into a plurality of frames for switching, instead of completing switching in one frame, so that transition of the HDR display effect is smooth, jump or flicker in display of HDR frame data is avoided, and experience of viewing the frame data by a user is improved.

DETAILED DESCRIPTION OF ILLUSTRATIVE EMBODIMENTS

Figure 1A:
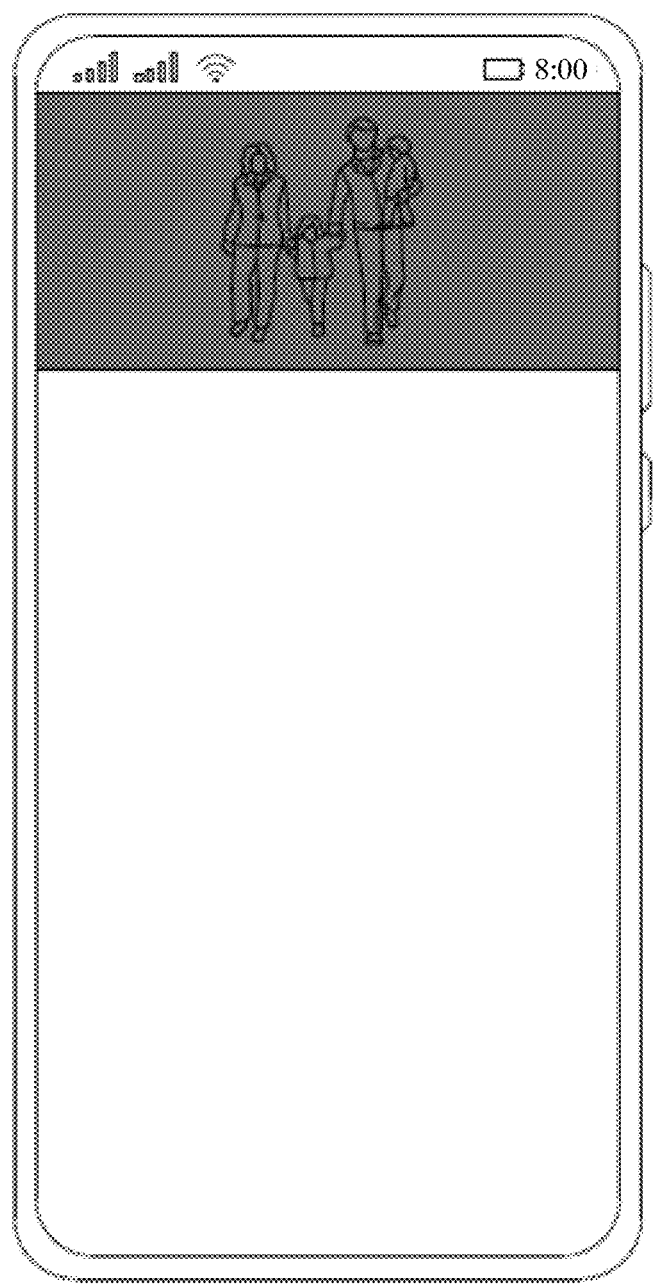
FIG. 1A is a schematic diagram of a state in which a video is played in a small window on a portrait screen of an electronic device according to an embodiment of this application.

For ease of understanding, some concepts related to embodiments of this application are explained as examples for reference.

It should be noted that, terms "first" and "second" used in embodiments of this application are used for descriptive purposes only, and cannot be construed as indicating or implying relative importance or implicitly indicating a quantity of technical features indicated. Therefore, a feature defined by "first" or "second" may explicitly or implicitly include one or more such features. In the descriptions of embodiments of this application, words such as "for example" or "such as" are used to mean an example, an illustration, or a description. Any embodiment or design solution described as "example" or "for example" in embodiments of this application should not be construed as being more preferred or advantageous than other embodiments or design solutions. Exactly, use of the words such as "an example" or "for example" is intended to present a related concept in a specific manner.

Unless otherwise specified, all technical and scientific terms used in this specification have meanings that are the same as those commonly understood by a person skilled in the art of this application. The terms used in the specification of this application are merely intended to describe specific embodiments, but are not intended to limit this application. It should be understood that, in this application, unless otherwise stated, "/" indicates "or". For example, A/B may indicate A or B. In this application, "and/or" is merely an association relationship that describes associated objects, and indicates that three relationships may exist. For example, A and/or B may indicate the following three cases: Only A exists, both A and B exist, and only B exists. "At least one" means one or more. "A plurality of" means two or more. For example, at least one of a, b, or c may indicate the following seven cases: a, b, c, a and b, a and c, b and c, and a, b, and c.

A user interface (User Interface, UI) in embodiments of this application is a media interface for interaction and information exchange between an application or an operating system and a user, and can convert information between an internal form and a form acceptable by the user. A user interface of an application is source code written in specific computer language such as JAVA or extensible markup language (extensible markup language, XML). The source code of the interface is parsed and rendered on an electronic device, and is finally presented as content that can be recognized by a user, for example, a control such as a picture, text, or a button. A control (control) is a basic element of the user interface. Typical controls include a button (button), a widget (widget), a toolbar (toolbar), a menu bar (menu bar), a text box (text box), a scrollbar (scrollbar), an image (image), and text (text). An attribute and content of the control in the interface are defined by using a label or a node. For example, the control included in the interface is defined in the XML by using a node such as <Textview>, <ImgView>, or <VideoView>. One node corresponds to one control or attribute in the interface. After being parsed and rendered, the node is presented as user-visible content. In addition, interfaces of many applications, for example, an interface of a hybrid application (hybrid application), usually further include web pages. A web page, also referred to as a page, may be understood as a special control embedded in an application interface. The web page is source code written in a specific computer language, such as hyper text markup language (hyper text markup language, HTML), cascading style sheets (cascading style sheets, CSS), and JAVAScript (JavaScript, JS). The source code of the web page may be loaded and displayed, by using a browser or a web page display component similar to a browser function, as content recognizable by a user. Specific content included in the web page is also defined by using a label or a node in the source code of the web page. For example, an element and an attribute of the web page are defined in the HTML by using <p>, <img>, <video>, and <canvas>.

A common presentation form of the user interface is a graphic user interface (graphic user interface, GUI), which refers to a user interface that is displayed in a graphical manner and that is related to a computer operation. The graphic user interface may be an interface element such as an icon, a window, or a control that is displayed on a display of an electronic device.

The following embodiments and features in the embodiments may be combined, provided that no conflict occurs.

For better understanding of a frame data display method provided in embodiments of this application, the following first describes an application scenario of the frame data display method provided in embodiments of this application.

FIG. 1A is a schematic diagram of a state in which a video is played in a small window on a portrait screen of an electronic device according to an embodiment of this application. The electronic device usually has an SDR (Standard Dynamic Range, standard dynamic range) display function and an HDR (High Dynamic Range, high dynamic range) display function. When a video is played in a small window on a portrait screen of the electronic device, because the video occupies only a part of a display, there is no need to perform HDR display on a video frame, and a display interface of the display is displayed in an SDR.

Figure 1B:
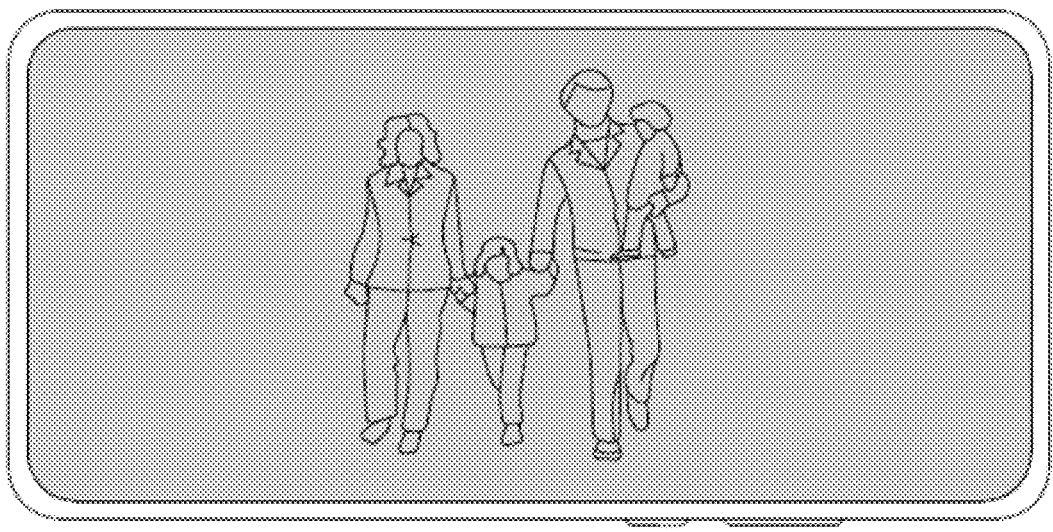
FIG. 1B is a schematic diagram of a state in which a video is played in full screen on an electronic device according to an embodiment of this application.

FIG. 1B is a schematic diagram of a state in which a video is played in full screen on an electronic device according to an embodiment of this application. When a video is played in full screen on the electronic device, to optimize a visual effect of watching the video in full screen by a user, the electronic device may display a video frame in an HDR.

Figure 1C:
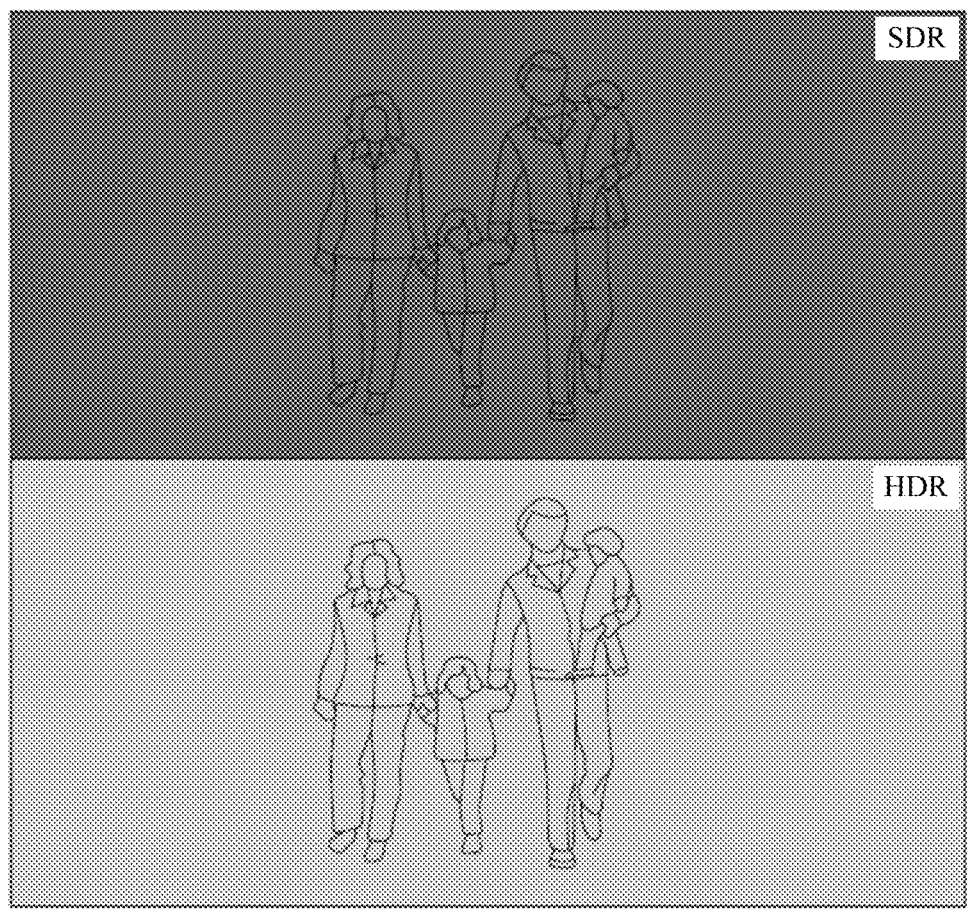
FIG. 1C is a schematic diagram of a comparison effect of SDR frame data and an HDR video frame according to an embodiment of this application.

FIG. 1C is a schematic diagram of comparison between an SDR video frame and an HDR video frame displayed on an electronic device according to an embodiment of this application. The electronic device usually completes switching from the SDR video frame to the HDR video frame by using one video frame. However, as shown in FIG. 1C, because brightness, saturation, or hue of the SDR video frame is different from that of the HDR video frame, if the SDR video frame is switched to the HDR video frame by using only one video frame, there is a great difference between visual effects of the video frame before and after switching, switching is not smooth enough, and jump or flicker easily occurs when a display displays the HDR video frame, thereby affecting viewing experience of a user.

Figure 2:
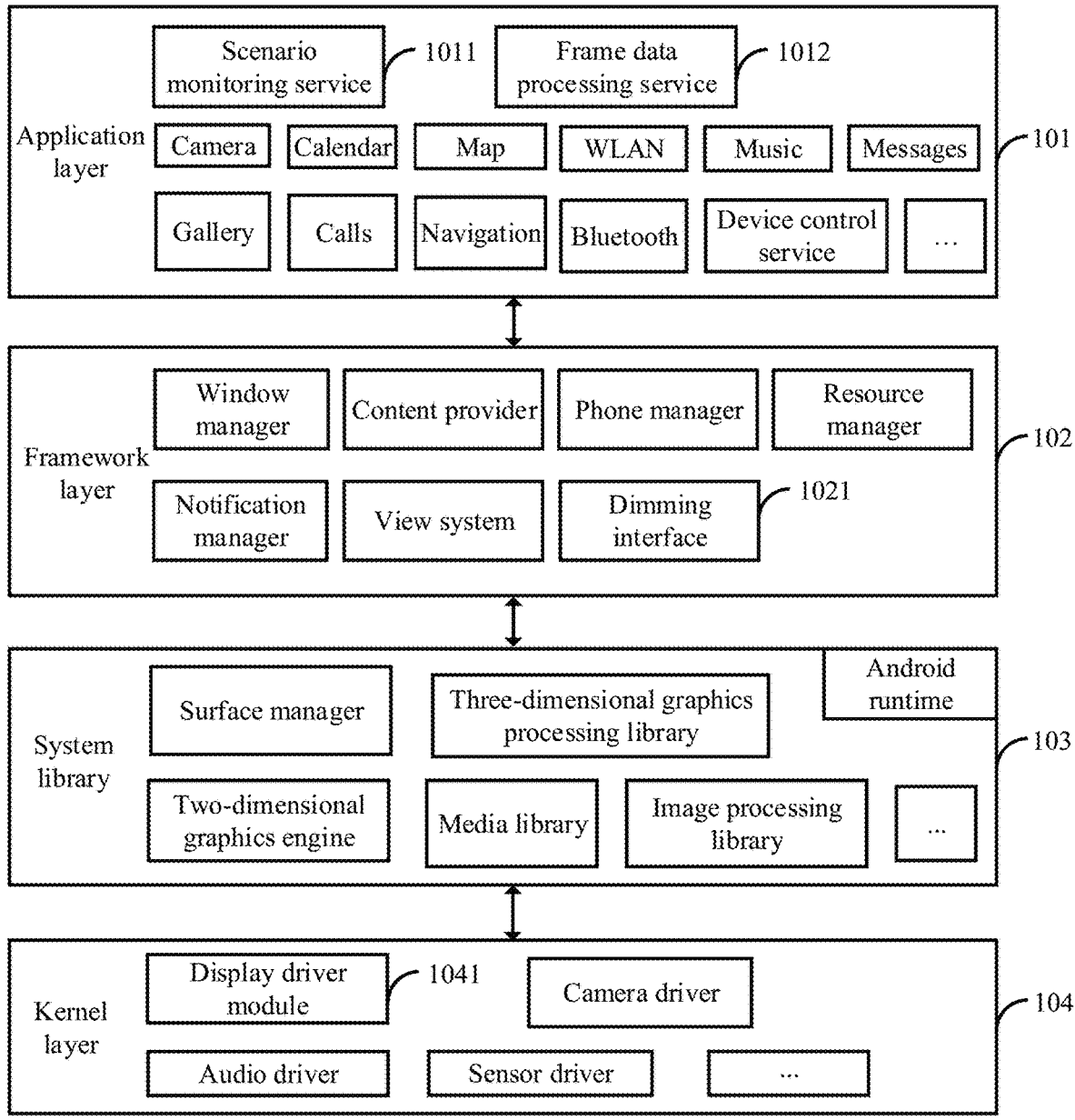
FIG. 2 is a diagram of a software architecture of an electronic device according to an embodiment of this application.

FIG. 2 is a diagram of a software architecture of an electronic device according to an embodiment of this application. A layered architecture divides software into several layers, and each layer has a clear role and task. The layers communicate with each other through software interfaces. For example, an Android system is divided into four layers from top to bottom: an application layer 101, a framework layer 102, Android runtime (Android runtime) and a system library 103, and a kernel layer 104.

The application layer may include a series of application packages. For example, the application packages may include applications such as Camera, Gallery, Calendar, Call, Map, Navigation, WLAN, Bluetooth, Music, Video, Messages, and a device control service.

The framework layer provides an application programming interface (Application Programming Interface, API) and a programming framework for applications at the application layer. The application framework layer includes some predefined functions. For example, the application framework layer may include a window manager, a content provider, a view system, a phone manager, a resource manager, a notification manager, and the like.

The window manager is used to manage a window program. The window manager may obtain a size of a display, determine whether there is a status bar, a lockscreen, a screenshot, and the like. The content provider is configured to store and obtain data, and enable the data to be accessible by an application. The data may include videos, images, audio, calls that are made and answered, browsing histories and bookmarks, phone books, and the like. The view system includes visual controls, for example, a control for displaying text and a control for displaying a picture. The view system may be configured to build an application. A display interface may include one or more views. For example, a display interface including a short message notification icon may include a view for displaying text and a view for displaying a picture. The phone manager is configured to provide a communication function of the electronic device, for example, call status management (including answering, hanging up, or the like). The resource manager provides various resources for an application, for example, a localized string, an icon, a picture, a layout file, and a video file. The notification manager enables an application to display notification information in the status bar, and may be configured to convey a message of a notification type, where the displayed notification information may automatically disappear after a short stay without user interaction. For example, the notification manager is configured to notify download completion, provide a message notification, and the like. The notification manager may alternatively be a notification that appears in a top status bar of a system in a form of a graph or scroll bar text, for example, a notification of an application running in the background or a notification that appears on a screen in a form of a dialog window. For example, text information is prompted on the status bar, a prompt tone is made, the electronic device vibrates, and an indicator light flashes.

The Android Runtime includes a kernel library and a virtual machine. The Android runtime is responsible for scheduling and management of the Android system. The kernel library includes two parts: a functional function that needs to be invoked by a java language, and a kernel library of Android.

The application layer and the framework layer run on the virtual machine. The virtual machine executes java files at the application layer and the framework layer as binary files. The virtual machine is used to perform functions such as object lifecycle management, stack management, thread management, security and exception management, and garbage collection.

The system library may include a plurality of functional modules, such as a surface manager (surface manager), a media library (Media Libraries), a three-dimensional graphics processing library (for example, OpenGL ES), and a 2D graphics engine (for example, SGL).

The surface manager is configured to manage a display subsystem, and converge 2D and 3D layers of a plurality of applications. The media library supports playback and recording in a plurality of common audio and video formats, static image files, and the like. The media library may support a plurality of audio and video coding formats, such as MPEG4, H.264, MP3, AAC, AMR, JPG, and PNG. The three-dimensional graphics processing library is used to implement three-dimensional graphics drawing, image rendering, composition, layer processing, and the like. The 2D graphics engine is a graphics engine for 2D graphics.

The kernel layer is a layer between hardware and software. The kernel layer includes at least a display driver, a camera driver, an audio driver, and a sensor driver.

The kernel layer is a core of an operating system of an electronic device, and is first-layer software expansion based on hardware. The kernel layer provides a most basic function of the operating system, is a basis of the operating system, and is responsible for managing a system process, a memory, a device driver, a file, and a network system, and determines performance and stability of the system. For example, a kernel may determine when an application operates on a specific piece of hardware.

The kernel layer includes a program closely related to hardware, such as an interrupt handler and a device driver, further includes a basic and common module with relatively high operating frequency, such as a clock management module and a process scheduling module, and further includes a key data structure. The kernel layer may be disposed in a processor, or may be solidified in an internal memory.

To resolve a problem that display of a video frame jumps or flickers when an SDR video frame is switched to and displayed as an HDR video frame, an embodiment of this application provides a frame data display method.

Figure 3:
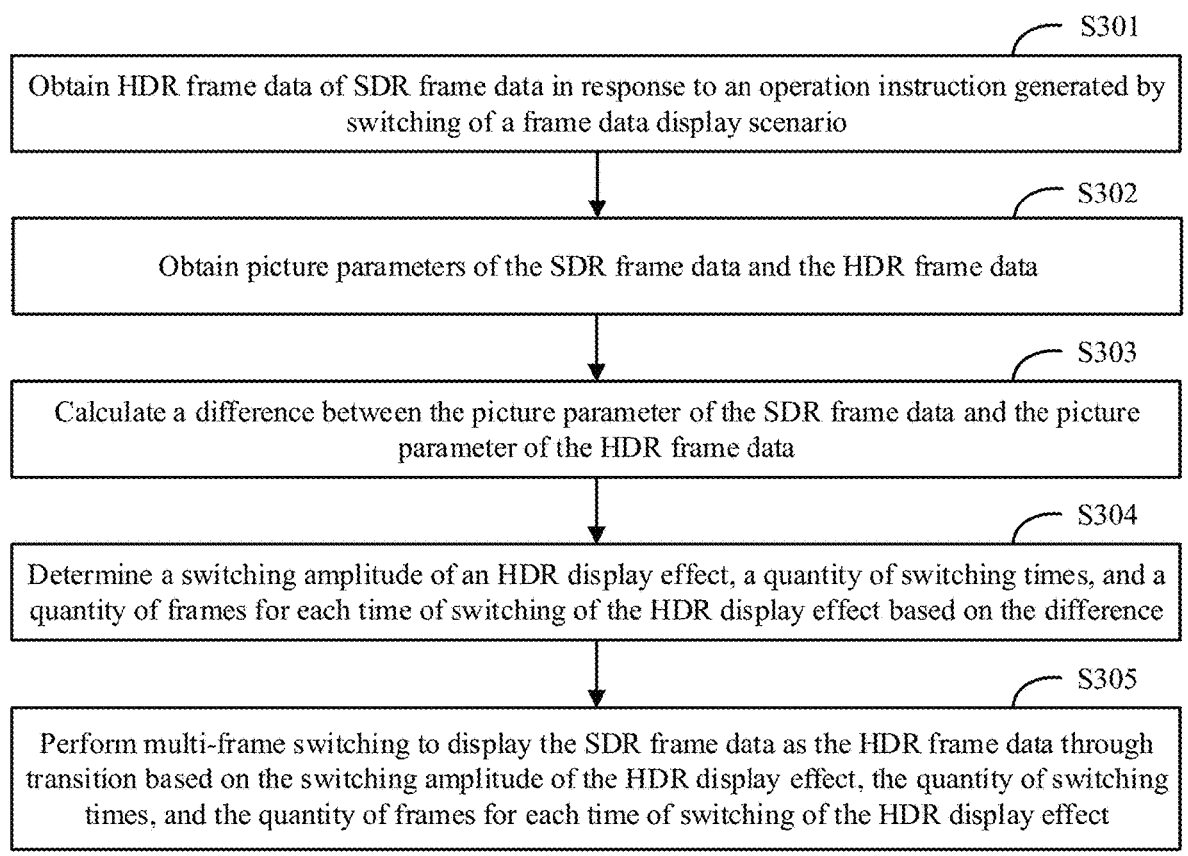
FIG. 3 is a flowchart of a frame data display method according to an embodiment of this application.

FIG. 3 is a flowchart of a frame data display method according to an embodiment of this application. The method is used in an electronic device, and the frame data display method includes the following steps.

S301: Obtain HDR frame data of SDR frame data in response to an operation instruction generated by switching of a frame data display scenario.

In an embodiment of this application, an HDR display function of the electronic device is enabled by default, and frame data may be displayed in an HDR in a preset display scenario. In another embodiment, the electronic device may have an option of the HDR display function, and the option may be triggered by a user to enable the HDR display function, to display the frame data in an HDR in the preset display scenario. Optionally, the preset display scenario includes at least one of the following scenarios: full-screen display and a scenario in which a current user interface is a preset application. The preset application may be a video-type or image-type application, and the image-type application may be an album of the electronic device or the like.

In an embodiment of this application, the preset display scenario switching is: switching the frame data from small-window display to full-screen display or switching a user interface of a display to a preset application interface.

For example, when the user starts a web page or an application on the electronic device, if the web page or an application interface includes a video, the video may be automatically played in a small window on a portrait screen (as shown in FIG. 1A). When the user taps full-screen play or places the electronic device horizontally, the video is switched to be played in a full-screen manner (as shown in FIG. 1B). When the video is switched to full-screen play, HDR frame data of an SDR video frame is obtained.

Figure 4A:
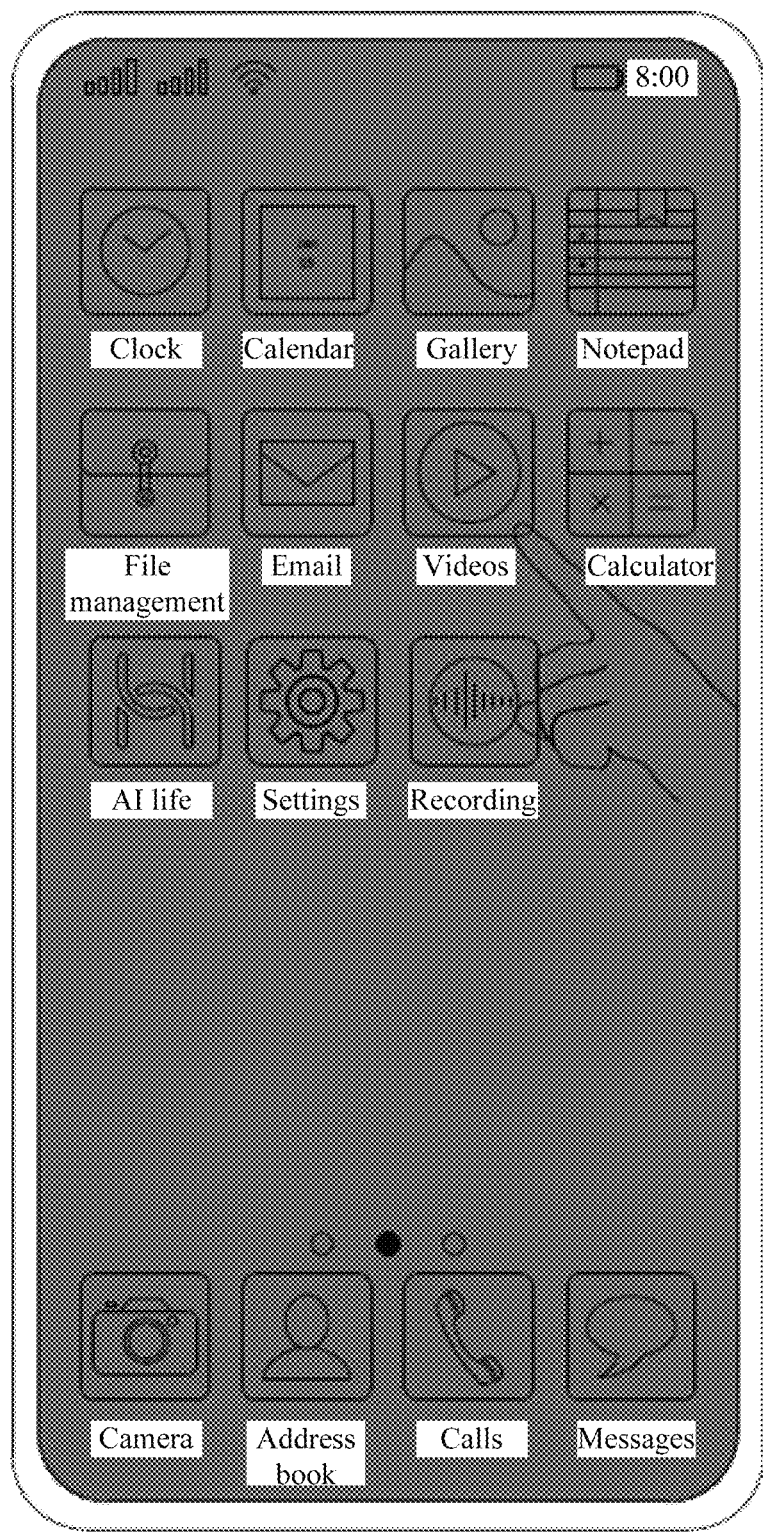
FIG. 4A is a schematic diagram of a user interface of an electronic device according to an embodiment of this application.
Figure 4B:
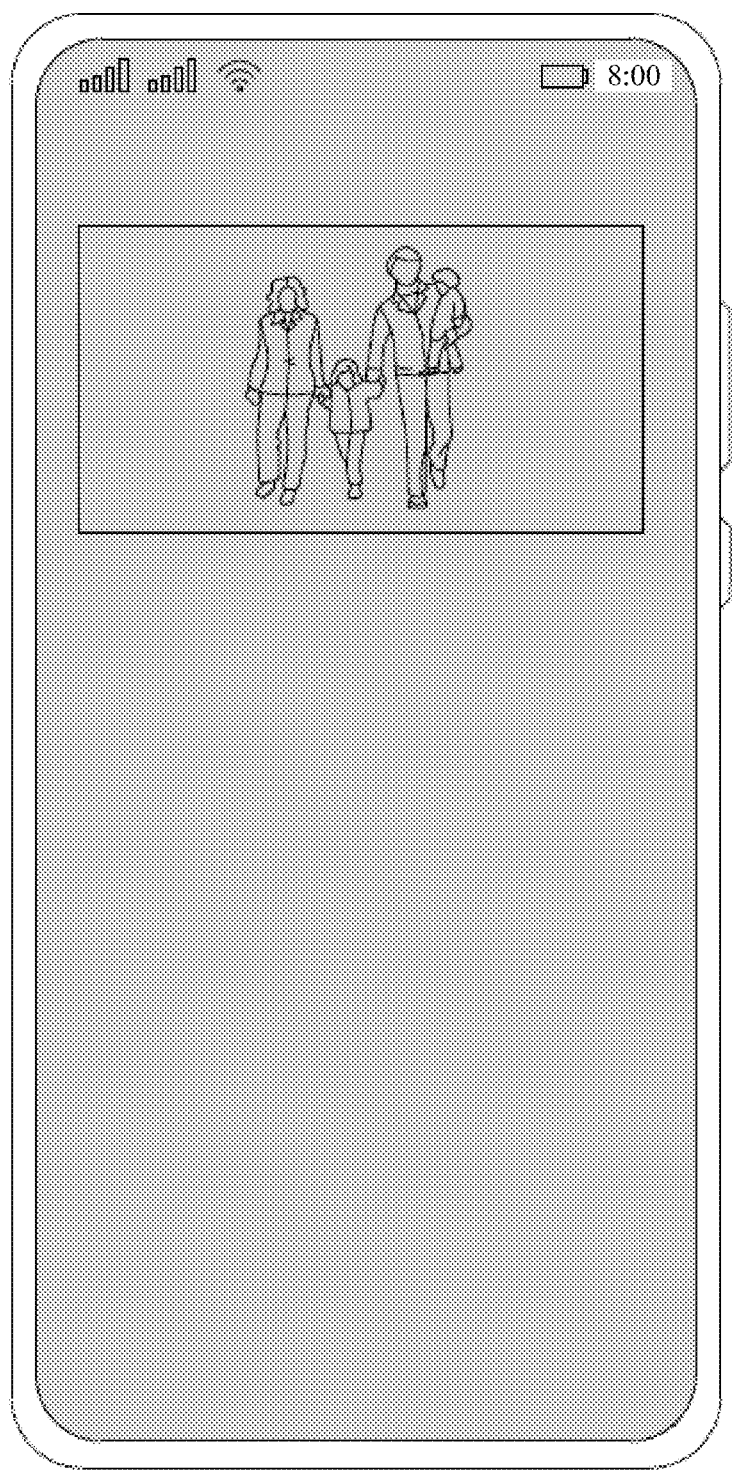
FIG. 4B is a schematic diagram of an application interface of an electronic device according to an embodiment of this application.

For example, as shown in FIG. 4A, a user interface currently displayed on the electronic device is a home screen. When the user taps an icon of a video application on the home screen, as shown in FIG. 4B, the user interface currently displayed on the electronic device is switched from the home screen to an interface of the video application, and when the user interface is switched to the interface of the video application, HDR frame data of SDR frame data (that is, image data of the user interface) is obtained.

As shown in FIG. 2, in an embodiment of this application, the application layer 101 includes a scenario monitoring service 1011 and a frame data processing service 1012. When the HDR display function of the electronic device is in an on state, the scenario monitoring service monitors in real time whether the frame data causes preset display scenario switching, that is, monitors whether a display scenario of the frame data is switched from small-window display to full-screen display or monitors whether the user interface of the display is switched to the preset application interface. If it is detected that the frame data causes the preset display scenario switching, that is, the display scenario of the frame data is switched from small-window display to full-screen display or the user interface of the display is switched to the preset application interface, the scenario monitoring service generates an operation instruction and sends the operation instruction to the frame data processing service. In response to the operation instruction, the frame data processing service obtains HDR data of the SDR frame data. The frame data may be data displayed on the display of the electronic device, and includes but is not limited to a video frame and an image.

In an embodiment of this application, in a process in which a display scenario of the frame data is switched and the SDR frame data is switched to and displayed as the HDR frame data, switching of an HDR effect starts from the SDR frame data currently displayed on the display, that is, switching starts from SDR frame data displayed on the display after switching of the display scenario of the frame data is completed. Therefore, HDR frame data corresponding to the SDR frame data displayed on the display after the switching of the display scenario of the frame data is completed is obtained.

In another embodiment, the switching of the frame data display scenario may be switching of any other scenario in which a display effect of frame data needs to be optimized.

In another embodiment, the HDR frame data corresponding to the SDR frame data currently displayed on the display may alternatively be obtained in response to an operation instruction of the user for enabling the HDR function. In any display scenario of the frame data, if the user triggers the option of the HDR display function, the currently displayed SDR frame data needs to be switched to the HDR frame data, and switching of the HDR display effect starts from the currently displayed SDR frame data. Therefore, the HDR frame data corresponding to the currently displayed SDR frame data is obtained. For example, when a video is played in full screen on the electronic device, if the user triggers the option of the HDR display function, HDR frame data corresponding to a currently displayed SDR video frame is obtained.

In an embodiment of this application, the HDR frame data of the SDR frame data is obtained by the application player, and this includes: performing dynamic range expansion on the SDR frame data to obtain the corresponding HDR frame data. Inverse hue mapping may be performed on the SDR frame data to expand a dynamic range of the SDR frame data, to obtain the corresponding HDR frame data. Specifically, a smaller parameter range of the SDR frame data is expanded to a larger parameter range based on an inverse hue mapping curve. For example, a brightness range of the SDR frame data is 0-200 nit, and the brightness range 0-200 nit is expanded to a brightness range 0-1000 nit based on the inverse hue mapping curve. Alternatively, the SDR frame data may be input into a pre-trained dynamic range expansion model, and output to obtain the corresponding HDR frame data. The dynamic range expansion model is a convolutional neural network model established through training based on SDR image data and HDR image data used as training data in a process in which the SDR frame data is switched to the HDR frame data.

S302: Obtain picture parameters of the SDR frame data and the HDR frame data.

In an embodiment of this application, a type of the picture parameter includes contrast. Contrast of an image is represented by using an APL (Average Picture Level, average picture level) value, saturation is an S (Saturation) component of the image in HSV color space, and hue is an H (Hue) component of the image in the HSV color space.

Figure 5:
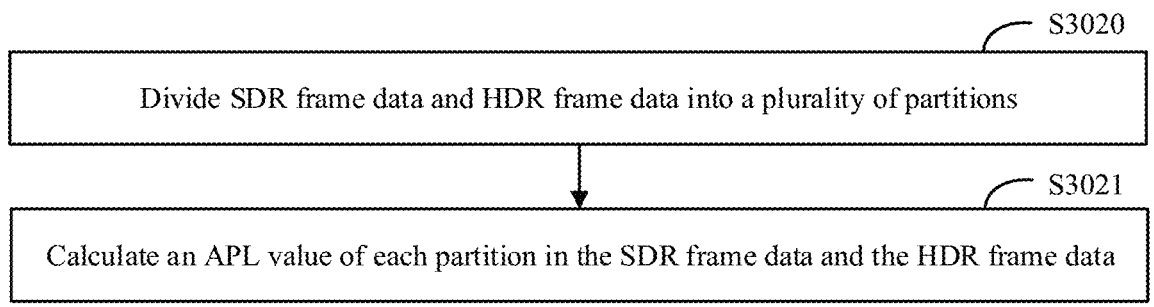
FIG. 5 is a flowchart of obtaining picture parameters of SDR frame data and HDR frame data according to an embodiment of this application.

In an embodiment of this application, the picture parameters of the SDR frame data and the HDR frame data are obtained by the application layer, and a detailed procedure may be shown in FIG. 5, and specifically includes the following steps.

S3020: Divide the SDR frame data and the HDR frame data into a plurality of partitions.

In an embodiment of this application, the dividing the SDR frame data and the HDR frame data into a plurality of partitions includes: dividing the SDR frame data into P*P partitions based on resolution of the SDR frame data, and dividing the HDR frame data into P*P partitions based on resolution of the HDR frame data. The resolution of the SDR frame data is the same as the resolution of the HDR frame data.

For example, both the resolution of the SDR frame data and the resolution of the HDR frame data are 1024*472, and P is 4. The SDR frame data and the HDR frame data are each divided into 4*4 partitions based on the resolution 1024*472 of the SDR frame data and the HDR frame data, and resolution of each partition is 256*118.

S3021: Calculate an APL value of each partition in the SDR frame data and the HDR frame data.

In an embodiment of this application, the calculating an APL value of each partition in the SDR frame data and the HDR frame data includes: calculating the APL value of the partition based on a grayscale value of each pixel in the partition and a quantity of pixels. A formula for calculating the APL value is:

$$APL = \sum_{k=1}^{x*y} \text{Gray}\ (i)/(x*y).$$

In the foregoing calculation formula, x is a quantity of horizontal-axis pixels in a partition image, y is a quantity of vertical-axis pixels in the partition image, x*y is a total quantity of pixels in the partition image, and Gray (i) is a grayscale value of each pixel in the partition image.

Figure 6:
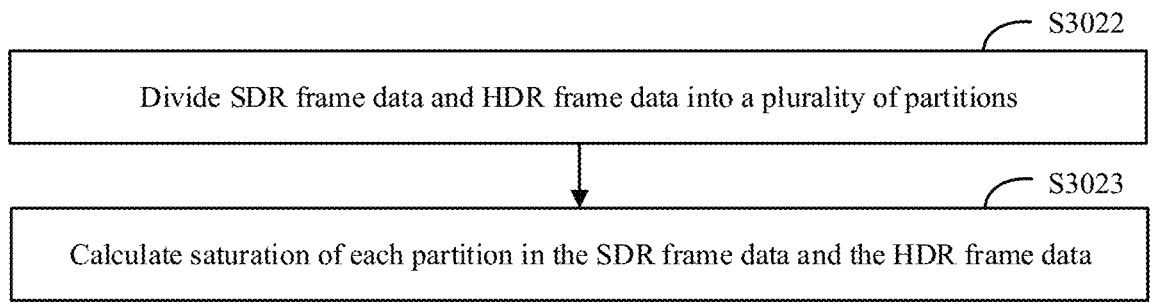
FIG. 6 is a flowchart of obtaining picture parameters of SDR frame data and HDR frame data according to another embodiment of this application.

In another embodiment of this application, the type of the picture parameter includes saturation, and the saturation is an S (Saturation) component of an image in HSV color space. A detailed procedure of another embodiment of obtaining the picture parameters of the SDR frame data and the HDR frame data may be shown in FIG. 6, and specifically includes the following steps.

S3022: Divide the SDR frame data and the HDR frame data into a plurality of partitions.

S3023: Calculate saturation of each partition in the SDR frame data and the HDR frame data.

In the another embodiment of this application, the calculating saturation of each partition in the SDR frame data and the HDR frame data includes: calculating the saturation of the partition based on an RGB value of each pixel in the partition in the SDR frame data and the HDR frame data. A formula for calculating the saturation is:

$$S = \begin{cases} 0, & \text{if max} = 0 \\ \frac{\max - \min}{\max}, & \text{otherwise} \end{cases}.$$

In the foregoing calculation formula, max is a maximum value in an R value, a G value, and a B value of a pixel in a partition image, and min is a minimum value in the R value, the G value, and the B value of the pixel in the partition image.

Figure 7:
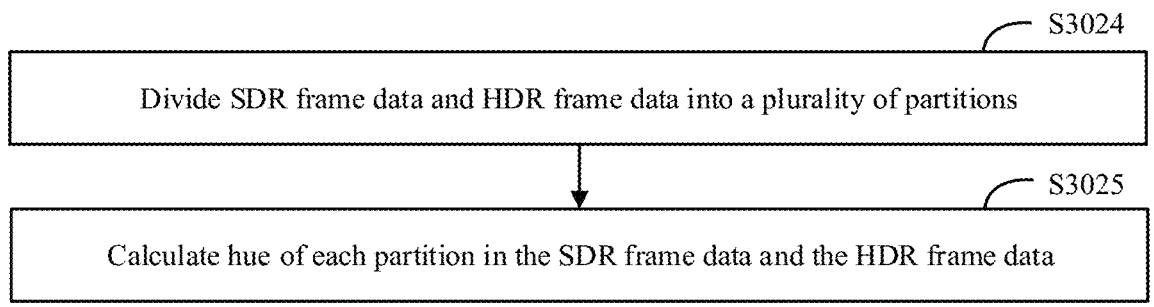
FIG. 7 is a flowchart of obtaining picture parameters of SDR frame data and HDR frame data according to another embodiment of this application.

In another embodiment of this application, the type of the picture parameter includes hue, and the hue is an H (Hue) component of an image in HSV color space. A detailed procedure of another embodiment of obtaining the picture parameters of the SDR frame data and the HDR frame data may be shown in FIG. 7, and specifically includes the following steps.

S3024: Divide the SDR frame data and the HDR frame data into a plurality of partitions.

S3025: Calculate hue of each partition in the SDR frame data and the HDR frame data.

In the another embodiment of this application, the calculating hue of each partition in the SDR frame data and the HDR frame data includes: calculating the hue of the partition based on an RGB value of each pixel in the partition in the SDR frame data and the HDR frame data. A formula for calculating the hue is:

$$H = \begin{cases} 0°, & \text{if max} = \min \\ 60° \times \frac{G-B}{\max - \min} + 0° & \text{if max} = r \text{ and } g \geq b \\ 60° \times \frac{G-B}{\max - \min} + 360° & \text{if max} = r \text{ and } g < b \\ 60° \times \frac{B-R}{\max - \min} + 120° & \text{if max} = G \\ 60° \times \frac{R-G}{\max - \min} + 240° & \text{if max} = B \end{cases}.$$

In the foregoing calculation formula, max is a maximum value in an R value, a G value, and a B value of a pixel in a partition image, and min is a minimum value in the R value, the G value, and the B value of the pixel in the partition image.

Figure 8:
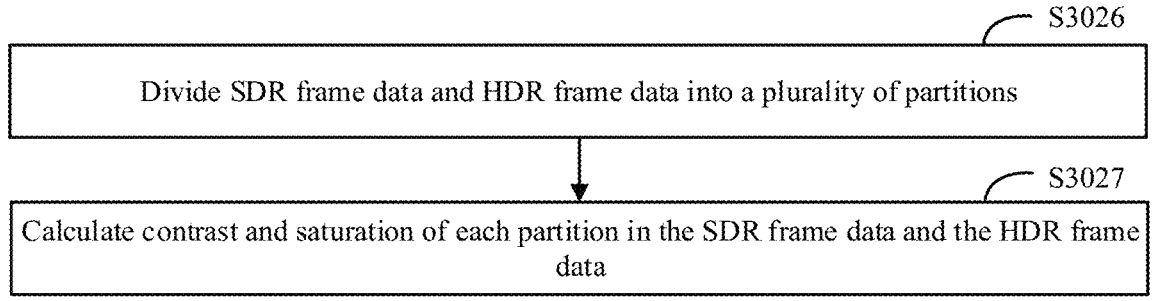
FIG. 8 is a flowchart of obtaining picture parameters of SDR frame data and HDR frame data according to another embodiment of this application.

In another embodiment of this application, the type of the picture parameter includes contrast and saturation. A detailed procedure of another embodiment of obtaining the picture parameters of the SDR frame data and the HDR frame data may be shown in FIG. 8, and specifically includes the following steps.

S3026: Divide the SDR frame data and the HDR frame data into a plurality of partitions.

S3027: Calculate contrast and saturation of each partition in the SDR frame data and the HDR frame data.

Figure 9:
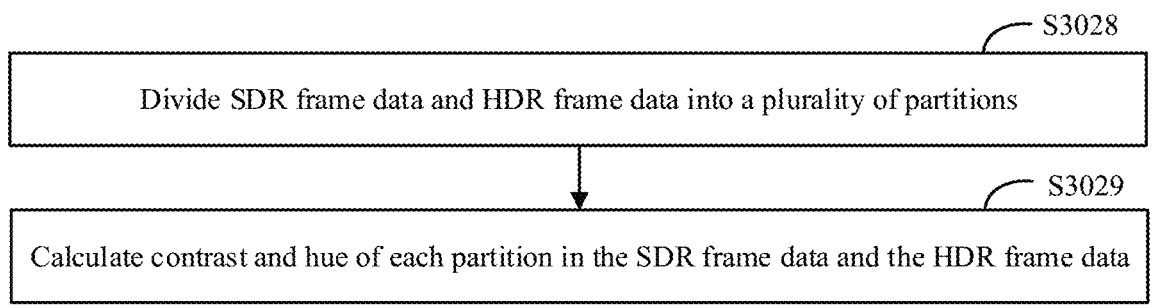
FIG. 9 is a flowchart of obtaining picture parameters of SDR frame data and HDR frame data according to another embodiment of this application.

In another embodiment of this application, the type of the picture parameter includes contrast and hue. A detailed procedure of another embodiment of obtaining the picture parameters of the SDR frame data and the HDR frame data may be shown in FIG. 9, and specifically includes the following steps.

S3028: Divide the SDR frame data and the HDR frame data into a plurality of partitions.

S3029: Calculate contrast and hue of each partition in the SDR frame data and the HDR frame data.

S303: Calculate a difference between the picture parameter of the SDR frame data and the picture parameter of the HDR frame data.

In an embodiment of this application, the calculating a difference between the picture parameter of the SDR frame data and the picture parameter of the HDR frame data includes: calculating a difference of at least one type of picture parameter between every two partitions at a same location in the SDR frame data and the HDR frame data; and determining that a maximum value in a plurality of calculated differences is the difference between the picture parameter of the SDR frame data and the picture parameter of the HDR frame data. When the SDR frame data and the HDR frame data overlap, two partitions whose projection areas overlap are partitions at a same location.

In an embodiment of this application, if the type of the picture parameter includes contrast, the calculating a difference between the picture parameter of the SDR frame data and the picture parameter of the HDR frame data includes: calculating an APL value difference between every two partitions at a same location in the SDR frame data and the HDR frame data; and determining that a maximum value in a plurality of calculated APL differences is the difference between the picture parameter of the SDR frame data and the picture parameter of the HDR frame data.

Figure 10A:
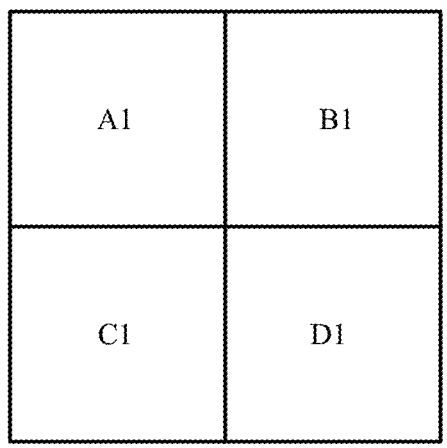
FIG. 10A is a schematic diagram of partitions of SDR frame data according to an embodiment of this application.
Figure 10B:
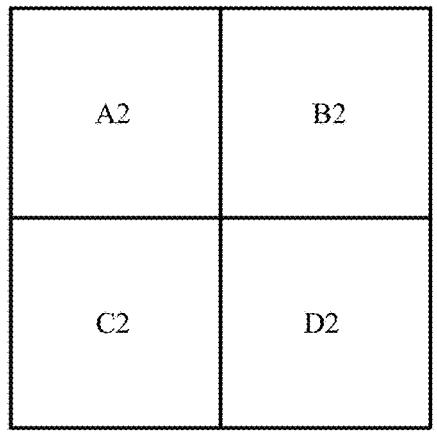
FIG. 10B is a schematic diagram of partitions of HDR frame data according to an embodiment of this application.

As shown in FIG. 10A, the SDR frame data includes partitions A1, B1, C1, and D1. As shown in FIG. 10B, the HDR frame data includes partitions A2, B2, C2, and D2. The partitions A1 and A2, the partitions B1 and B2, the partitions C1 and C2, and the partitions D1 and D2 are separately partitions at a same location. For example, it is assumed that an APL value of the partition A1 is 10%, an APL value of the partition B1 is 15%, an APL value of the partition C1 is 20%, an APL value of the partition D1 is 25%, an APL value of the partition A2 is 12%, an APL value of the partition B2 is 18%, an APL value of the partition C2 is 23%, and an APL value of the partition D2 is 30%. In this case, an APL difference between the partition A1 and the partition A2 is 2%, an APL difference between the partition B1 and the partition B2 is 3%, an APL difference between the partition C1 and the partition C2 is 3%, and an APL difference between the partition D1 and the partition D2 is 5%. Therefore, a maximum value in the plurality of APL differences is 5%, that is, the difference between the picture parameter of the SDR frame data and of the HDR frame data is 5%.

In another embodiment of this application, if the type of the picture parameter includes saturation, the calculating a difference between the picture parameter of the SDR frame data and the picture parameter of the HDR frame data includes: calculating a saturation difference between every two partitions at a same location in the SDR frame data and the HDR frame data, and determining that a maximum value in a plurality of calculated saturation differences is the difference between the picture parameter of the SDR frame data and the picture parameter of the HDR frame data.

For example, it is assumed that saturation of the partition A1 is 0.1, saturation of the partition B1 is 0.15, saturation of the partition C1 is 0.2, saturation of the partition D1 is 0.25, saturation of the partition A2 is 0.15, saturation of the partition B2 is 0.18, saturation of the partition C2 is 0.23, and saturation of the partition D2 is 0.3. In this case, a saturation difference between the partition A1 and the partition A2 is 0.02, a saturation difference between the partition B1 and the partition B2 is 0.03, a saturation difference between the partition C1 and the partition C2 is 0.03, and a saturation difference between the partition D1 and the partition D2 is 0.05. Therefore, a maximum value in the plurality of saturation differences is 0.05, that is, the difference between the picture parameter of the SDR frame data and the picture parameter of the HDR frame data is 0.05.

In another embodiment of this application, if the type of the picture parameter includes hue, the calculating a difference between the picture parameter of the SDR frame data and the picture parameter of the HDR frame data includes: calculating a hue difference between every two partitions at a same location in the SDR frame data and the HDR frame data, and determining that a maximum value in a plurality of calculated hue differences is the difference between the picture parameter of the SDR frame data and the picture parameter of the HDR frame data.

For example, it is assumed that hue of the partition A1 is 20°, hue of the partition B1 is 40°, hue of the partition C1 is 100°, hue of the partition D1 is 200°, hue of the partition A2 is 25°, hue of the partition B2 is 60°, hue of the partition C2 is 180°, and hue of the partition D2 is 270°. In this case, a hue difference between the partition A1 and the partition A2 is 5°, a hue difference between the partition B1 and the partition B2 is 20°, a hue difference between the partition C1 and the partition C2 is 80°, and a hue difference between the partition D1 and the partition D2 is 70°. Therefore, a maximum value in the plurality of hue differences is 80°, that is, the difference between the picture parameter of the SDR frame data and the picture parameter of the HDR frame data is 80°.

In another embodiment of this application, if the type of the picture parameter includes contrast and saturation, the calculating a difference between the picture parameter of the SDR frame data and the picture parameter of the HDR frame data includes: separately calculating an APL value difference and a saturation difference between every two partitions at a same location in the SDR frame data and the HDR frame data, and determining that a maximum value in a plurality of calculated APL differences and a maximum value in a plurality of calculated saturation differences are the difference between the picture parameter of the SDR frame data and the picture parameter of the HDR frame data.

In another embodiment of this application, if the type of the picture parameter includes contrast and hue, the calculating a difference between the picture parameter of the SDR frame data and the picture parameter of the HDR frame data includes: separately calculating an APL value difference and a hue difference between every two partitions at a same location in the SDR frame data and the HDR frame data, and determining that a maximum value in a plurality of calculated APL differences and a maximum value in a plurality of calculated hue differences are the difference between the picture parameter of the SDR frame data and the picture parameter of the HDR frame data.

S304: Determine a switching amplitude of an HDR display effect, a quantity of switching times, and a quantity of frames for each time of switching of the HDR display effect based on the difference between the picture parameter of the SDR frame data and the picture parameter of the HDR frame data.

In an embodiment of this application, the determining a switching amplitude of an HDR display effect, a quantity of switching times, and a quantity of frames for each time of switching of the HDR display effect based on the difference between the picture parameter of the SDR frame data and the picture parameter of the HDR frame data includes: dividing the difference between the picture parameter of the SDR frame data and the picture parameter of the HDR frame data into a preset quantity of equal parts, to obtain the switching amplitude of the HDR display effect and the quantity of switching times; and setting the quantity of frames for each time of switching of the HDR display effect. The quantity of switching times is a specified quantity of equal parts into which the difference is divided, that is, the preset quantity, and the switching amplitude is a difference between equal parts obtained by dividing the difference based on the preset quantity of equal parts.

In an embodiment of this application, if the type of the picture parameter includes contrast, the dividing the difference between the picture parameter of the SDR frame data and the picture parameter of the HDR frame data into a preset quantity of equal parts, to obtain the switching amplitude of the HDR display effect, the quantity of switching times, and the quantity of frames for each time of switching of the HDR display effect includes: dividing a maximum APL difference into a first preset quantity of equal parts, to obtain the switching amplitude of the HDR display effect and the quantity of switching times; and setting a quantity of frames for each time of switching of contrast. Switching amplitude for contrast=Maximum APL difference/First preset quantity. The quantity of switching times is equal to the first preset quantity.

Optionally, the first preset quantity is 5. For example, the maximum APL difference is 5%, and the dividing a maximum APL difference into a first preset quantity of equal parts includes: dividing the maximum APL difference 5% into five equal parts, where an APL value of each equal part is 1%, that is, the switching amplitude for contrast is APL 1%, and the quantity of switching times is 5.

In another embodiment of this application, if the type of the picture parameter includes saturation, the dividing the difference between the picture parameter of the SDR frame data and the picture parameter of the HDR frame data into a preset quantity of equal parts, to obtain the switching amplitude of the HDR display effect, the quantity of switching times, and the quantity of frames for each time of switching of the HDR display effect includes: dividing a maximum saturation difference into a second preset quantity of equal parts, to obtain a switching amplitude for saturation in the HDR display effect and a quantity of switching times; and setting a quantity of frames for each time of switching of saturation. Switching amplitude for saturation=Maximum saturation difference/Second preset quantity. The quantity of switching times for saturation is equal to the second preset quantity.

Optionally, the second preset quantity is 2. For example, the maximum saturation difference is 0.05, and the dividing a maximum saturation difference into a second preset quantity of equal parts includes: dividing the maximum saturation difference 0.05 into two equal parts, where saturation of each equal part is 0.025, that is, the switching amplitude for saturation is 0.025, and the quantity of switching times is 2.

In another embodiment of this application, if the type of the picture parameter includes hue, the dividing the difference between the picture parameter of the SDR frame data and the picture parameter of the HDR frame data into a preset quantity of equal parts, to obtain the switching amplitude of the HDR display effect, the quantity of switching times, and the quantity of frames for each time of switching of the HDR display effect includes: dividing a maximum hue difference into a second preset quantity of equal parts, to obtain a switching amplitude for hue in the HDR display effect and a quantity of switching times; and setting a quantity of frames for each time of switching of hue. Switching amplitude for hue=Maximum hue difference/Second preset quantity. The quantity of switching times for hue is equal to the second preset quantity.

Optionally, the second preset quantity is 2. For example, the maximum hue difference is 80°, and dividing a maximum hue difference into a second preset quantity of equal parts includes: dividing the maximum hue difference 80° into two equal parts, where saturation of each equal part is 40°, that is, the switching amplitude for hue is 40°, and the quantity of switching times is 2.

In another embodiment of this application, if the type of the picture parameter includes contrast and saturation, the dividing the difference between the picture parameter of the SDR frame data and the picture parameter of the HDR frame data into a preset quantity of equal parts, to obtain the switching amplitude of the HDR display effect, the quantity of switching times, and the quantity of frames for each time of switching of the HDR display effect includes: dividing a maximum APL difference into a first preset quantity of equal parts, and dividing a maximum saturation difference into a second preset quantity of equal parts, to obtain switching amplitudes for contrast and saturation in the HDR display effect and quantities of switching times; and separately setting a quantity of frames for each time of switching of contrast and a quantity of frames for each time of switching of saturation. Switching amplitude for contrast=Maximum APL difference/First preset quantity. The quantity of switching times for contrast is equal to the first preset quantity. Switching amplitude for saturation=Maximum saturation difference/Second preset quantity. The quantity of switching times for saturation is equal to the second preset quantity.

In another embodiment of this application, if the type of the picture parameter includes contrast and hue, the dividing the difference between the picture parameter of the SDR frame data and the picture parameter of the HDR frame data into a preset quantity of equal parts, to obtain the switching amplitude of the HDR display effect, the quantity of switching times, and the quantity of frames for each time of switching of the HDR display effect includes: dividing a maximum APL difference into a first preset quantity of equal parts, and dividing a maximum hue difference into a second preset quantity of equal parts, to obtain switching amplitudes for contrast and hue in the HDR display effect and quantities of switching times; and separately setting a quantity of frames for each time of switching of contrast and a quantity of frames for each time of switching of hue. Switching amplitude for contrast=Maximum APL difference/First preset quantity. The quantity of switching times for contrast is equal to the first preset quantity. Switching amplitude for hue=Maximum hue difference/Second preset quantity. The quantity of switching times for hue is equal to the second preset quantity.

S305: Perform multi-frame switching to display the SDR frame data as the HDR frame data through transition based on the switching amplitude of the HDR display effect, the quantity of switching times, and the quantity of frames for each time of switching of the HDR display effect.

In an embodiment of this application, the framework layer 102 includes a dimming (dimming) interface 1021, and the kernel layer 104 includes a display driver module 1041. The display driver module may be a display driver circuit or a display driver chip.

In an embodiment of this application, the performing multi-frame switching to display the SDR frame data as the HDR frame data based on the switching amplitude of the HDR display effect, the quantity of switching times, and the quantity of frames for each time of switching of the HDR display effect includes: delivering the switching amplitude of the HDR display effect, the quantity of switching times, and the quantity of frames for each time of switching of the HDR display effect to the display driver module through the dimming interface; and driving, by the display driver module based on the switching amplitude of the HDR display effect, the quantity of switching times, and the quantity of frames for each time of switching of the HDR display effect, a display to perform multi-frame switching to display the SDR frame data as the HDR frame data through transition.

Figure 11:
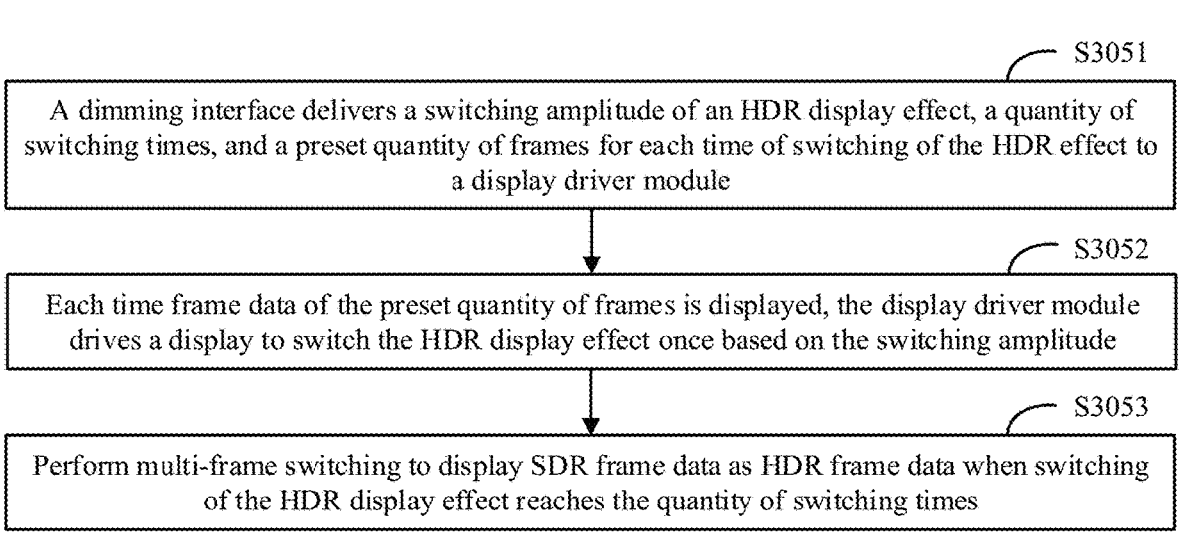
FIG. 11 is a flowchart showing that a display driver module drives a display to perform multi-frame switching to display SDR frame data as HDR frame data through transition according to an embodiment of this application.

In an embodiment of this application, the framework layer delivers the switching amplitude of the HDR display effect, the quantity of switching times, and the quantity of frames for each time of switching of the HDR display effect to the display driver module through the dimming interface. In other words, the application layer transmits the switching amplitude of the HDR display effect, the quantity of switching times, and the quantity of frames for each time of switching of the HDR display effect to the framework layer, and at the framework layer, the dimming interface delivers the switching amplitude, the quantity of switching times, and the quantity of frames for each time of switching of the HDR display effect to the display driver module. That the display driver module drives the display to perform multi-frame switching to display the SDR frame data as the HDR frame data through transition is performed by the kernel layer. A detailed procedure is shown in FIG. 11, and specifically includes the following steps.

S3051: The dimming interface delivers the switching amplitude of the HDR display effect, the quantity of switching times, and the preset quantity of frames for each time of switching of the HDR effect to the display driver module.

S3052: Each time frame data of the preset quantity of frames is displayed, the display driver module drives the display to switch the HDR display effect once for the frame data based on the switching amplitude. Switching the HDR display effect once is adjusting the picture parameter of the frame data once.

S3053: Perform multi-frame switching to display the SDR frame data as the HDR frame data when switching of the HDR display effect reaches the quantity of switching times. Multiple frames=Quantity of switching times*Preset quantity of frames for each time of switching of the HDR effect. For example, if the quantity of switching times is 5, and the preset quantity of frames for each time of switching of the HDR effect is 2, the multiple frames are 10 frames.

In an embodiment of this application, if the type of the picture parameter includes contrast, that the dimming interface delivers the switching amplitude of the HDR display effect, the quantity of switching times, and the preset quantity of frames for each time of switching of the HDR effect to the display driver module includes: The dimming interface delivers the switching amplitude for contrast, the quantity of switching times, and the first preset quantity of frames for each time of switching of contrast to the display driver module.

That each time frame data of the preset quantity of frames is displayed, the display driver module drives the display to switch the HDR display effect once for the frame data based on the switching amplitude includes: The display driver module drives the display to adjust, each time frame data of the first preset quantity of frames is displayed, contrast of the frame data based on the switching amplitude.

The performing multi-frame switching to display the SDR frame data as the HDR frame data when switching of the HDR display effect reaches the quantity of switching times includes: in a process in which the frame data is switched from being displayed in an SDR to being displayed in an HDR, if a quantity of times of adjusting contrast of the frame data based on the switching amplitude reaches the first preset quantity of times, completing adjustment of the contrast.

For example, the first preset quantity of frames is 2, the switching amplitude is APL 1%, and the quantity of switching times of the first preset quantity is 5. The display driver module drives the display to separately increase contrast of displayed two frames of frame data by APL 1% each time the two frames of frame data are displayed, so that when a quantity of frames of displayed frame data reaches 10 and the quantity of switching times reaches 5, contrast of the displayed frame data is increased by APL 5% in total. In this way, adjustment of contrast in the HDR display effect is completed.

In another embodiment of this application, if the type of the picture parameter includes saturation, that the dimming interface delivers the switching amplitude of the HDR display effect, the quantity of switching times, and the preset quantity of frames for each time of switching of the HDR effect to the display driver module includes: The dimming interface delivers the switching amplitude for saturation, the quantity of switching times, and the second preset quantity of frames for each time of switching of saturation to the display driver module.

That each time frame data of the preset quantity of frames is displayed, the display driver module drives the display to switch the HDR display effect once for the frame data based on the switching amplitude includes: The display driver module drives the display to adjust, each time frame data of the second preset quantity of frames is displayed, saturation of the frame data based on the switching amplitude.

The performing multi-frame switching to display the SDR frame data as the HDR frame data when switching of the HDR display effect reaches the quantity of switching times includes: in a process in which the frame data is switched from being displayed in an SDR to being displayed in an HDR, if a quantity of times of adjusting saturation of the frame data based on the switching amplitude reaches a quantity of times of the second preset quantity, completing adjustment of the saturation.

For example, the second preset quantity of frames is 3, the switching amplitude is saturation of 0.025, and the quantity of switching times of the second preset quantity is 2. The display driver module drives the display to separately increase saturation of displayed three frames of frame data by 0.025 each time the three frames of frame data are displayed, so that when a quantity of frames of displayed frame data reaches 6 and the quantity of switching times reaches 2, saturation of the displayed frame data is increased by 0.05 in total. In this way, adjustment of saturation in the HDR display effect is completed.

In another embodiment of this application, if the type of the picture parameter includes hue, that the dimming interface delivers the switching amplitude of the HDR display effect, the quantity of switching times, and the preset quantity of frames for each time of switching of the HDR effect to the display driver module includes: The dimming interface delivers the switching amplitude for hue, the quantity of switching times, and the second preset quantity of frames for each time of switching of hue to the display driver module.

That each time frame data of the preset quantity of frames is displayed, the display driver module drives the display to switch the HDR display effect once for the frame data based on the switching amplitude includes: The display driver module drives the display to adjust, each time frame data of the second preset quantity of frames is displayed, hue of the frame data based on the switching amplitude.

The performing multi-frame switching to display the SDR frame data as the HDR frame data when switching of the HDR display effect reaches the quantity of switching times includes: in a process in which the frame data is switched from being displayed in an SDR to being displayed in an HDR, if a quantity of times of adjusting hue of the frame data based on the switching amplitude reaches a quantity of times of the second preset quantity, completing adjustment of the hue.

For example, the second preset quantity of frames is 3, the switching amplitude is hue of 40°, and the quantity of switching times of the second preset quantity is 2. The display driver module drives the display to separately increase hue of displayed three frames of frame data by 40° each time the three frames of frame data are displayed, so that when a quantity of frames of displayed frame data reaches 6 and the quantity of switching times reaches 2, hue of the displayed frame data is increased by 80° in total. In this way, adjustment of hue in the HDR display effect is completed.

In another embodiment of this application, if the type of the picture parameter includes contrast and saturation, that the dimming interface delivers the switching amplitude of the HDR display effect, the quantity of switching times, and the preset quantity of frames for each time of switching of the HDR effect to the display driver module includes: The dimming interface separately delivers the switching amplitude for contrast, the switching amplitude for saturation, the quantities of switching times, the first preset quantity of frames for each time of switching of contrast, and the second preset quantity of frames for each time of switching of saturation to the display driver module.

That each time frame data of the preset quantity of frames is displayed, the display driver module drives the display to switch the HDR display effect once for the frame data based on the switching amplitude includes: The display driver module drives the display to adjust, each time frame data of the first preset quantity of frames is displayed, contrast of the frame data based on the switching amplitude for contrast, and adjust, each time frame data of the second preset quantity of frames is displayed, saturation of the frame data based on the switching amplitude for saturation.

The performing multi-frame switching to display the SDR frame data as the HDR frame data when switching of the HDR display effect reaches the quantity of switching times includes: in a process in which the frame data is switched from being displayed in an SDR to being displayed in an HDR, if a quantity of times of adjusting contrast of the frame data based on the switching amplitude for contrast reaches a quantity of times of the first preset quantity, and a quantity of times of adjusting saturation of the frame data based on the switching amplitude for saturation reaches a quantity of times of the second preset quantity, completing adjustment of the contrast and the saturation.

For example, the first preset quantity of frames is 2, the switching amplitude for contrast is APL 1%, the quantity of switching times of the first preset quantity is 5, the second preset quantity of frames is 3, the switching amplitude for saturation is 0.025, and the quantity of switching times of the second preset quantity is 2. The display driver module drives the display to separately increase contrast of displayed two frames of frame data by APL 1% each time the two frames of frame data are displayed, so that when a quantity of frames of displayed frame data reaches 10 and the quantity of switching times for contrast reaches 5, contrast of the displayed frame data is increased by APL 5% in total; and the display driver module drives the display to separately increase saturation of displayed three frames of frame data by 0.025 each time the three frames of frame data are displayed, so that when a quantity of frames of displayed frame data reaches 6 and the quantity of switching times for saturation reaches 2, saturation of the displayed frame data is increased by 0.05 in total. In this way, adjustment of the contrast and the saturation is completed.

In another embodiment of this application, if the type of the picture parameter includes contrast and hue, that the dimming interface delivers the switching amplitude of the HDR display effect, the quantity of switching times, and the preset quantity of frames for each time of switching of the HDR effect to the display driver module includes: The dimming interface separately delivers the switching amplitude for contrast, the switching amplitude for hue, the quantities of switching times, the first preset quantity of frames for each time of switching of contrast, and the second preset quantity of frames for each time of switching of hue to the display driver module.

That each time frame data of the preset quantity of frames is displayed, the display driver module drives the display to switch the HDR display effect once for the frame data based on the switching amplitude includes: The display driver module drives the display to adjust, each time frame data of the first preset quantity of frames is displayed, contrast of the frame data based on the switching amplitude for contrast, and adjust, each time HDR frame data of the second preset quantity of frames is displayed, hue of the frame data based on the switching amplitude for hue.

The performing multi-frame switching to display the SDR frame data as the HDR frame data when switching of the HDR display effect reaches the quantity of switching times includes: in a process in which the frame data is switched from being displayed in an SDR to being displayed in an HDR, if a quantity of times of adjusting contrast of the frame data based on the switching amplitude for contrast reaches a quantity of times of the first preset quantity, and a quantity of times of adjusting hue of the frame data based on the switching amplitude for hue reaches a quantity of times of the second preset quantity, completing adjustment of the contrast and the hue.

For example, the first preset quantity of frames is 2, the switching amplitude for contrast is APL 1%, the quantity of switching times of the first preset quantity is 5, the second preset quantity of frames is 3, the switching amplitude for hue is 40°, and the quantity of switching times of the second preset quantity is 2. The display driver module drives the display to separately increase contrast of displayed two frames of frame data by APL 1% each time the two frames of frame data are displayed, so that when a quantity of frames of displayed frame data reaches 10 and the quantity of switching times for contrast reaches 5, contrast of the displayed frame data is increased by APL 5% in total; and the display driver module drives the display to separately increase hue of displayed three frames of frame data by 40° each time the three frames of frame data are displayed, so that when a quantity of frames of displayed frame data reaches 6 and the quantity of switching times for hue reaches 2, hue of the displayed frame data is increased by 120° in total. In this way, adjustment of the contrast and the hue is completed.

In the foregoing embodiment, when a quantity of types of picture parameters is greater than one, because time for calculating differences between picture parameters of different types is different, the picture parameters of different types also correspond to different quantities of frames for switching of the HDR display effect and different quantities of switching times. Therefore, switching time required for completing HDR display effects of the picture parameters of different types is different. In terms of a visual effect of the user, switching of the HDR display effects of the picture parameters of different types is not synchronous.

To keep synchronization between the HDR display effects of the picture parameters of different types and optimize the visual effect of the user, after the SDR frame data is switched to the HDR frame data, the display still displays SDR frame data of a specific quantity of frames, to wait for completion of calculation of differences between the picture parameters of different types. In addition, a same quantity of switching times and a same quantity of frames for each time of switching of the HDR effect are set for the picture parameters of different types.

Figure 12:
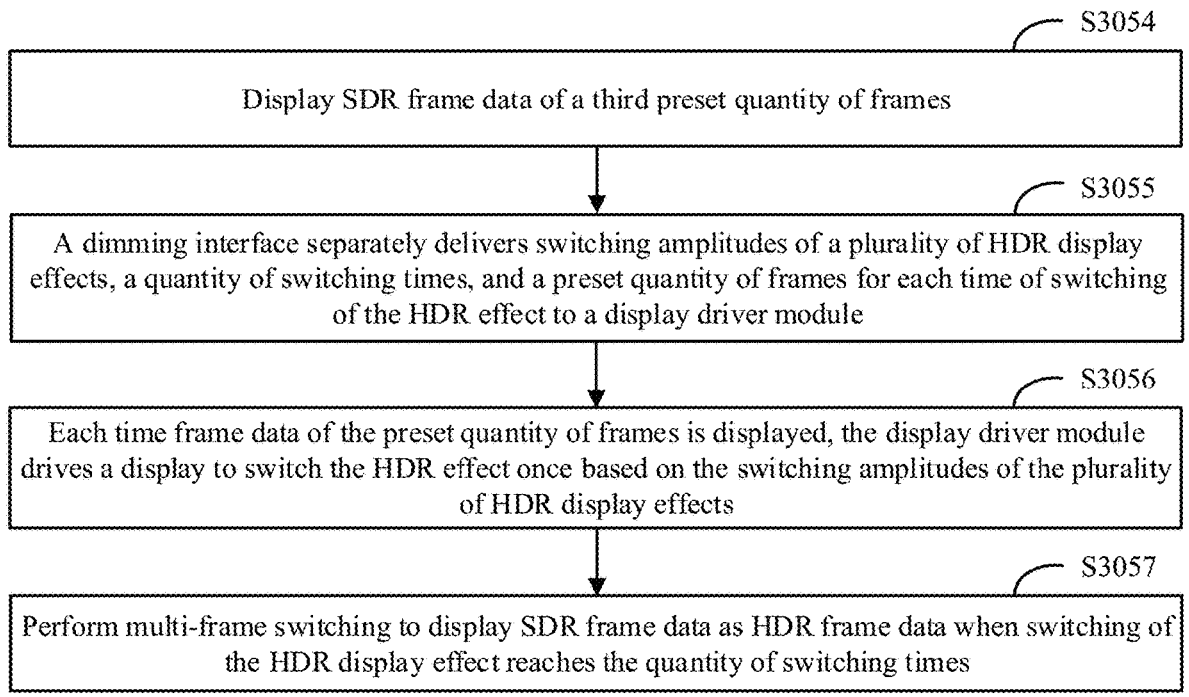
FIG. 12 is a flowchart showing that a display driver module drives a display to perform multi-frame switching to display SDR frame data as HDR frame data through transition according to another embodiment of this application.

In this way, in another embodiment of this application, a detailed procedure in which a switching parameter of the HDR display effect is delivered to the display driver module through the dimming interface and the display driver module drives the display to display the HDR frame data by using the switching parameter is shown in FIG. 12, and specifically includes the following steps.

S3054: If there are at least two types of picture parameters, display SDR frame data of a third preset quantity of frames.

In the another embodiment of this application, the displaying SDR frame data of a third preset quantity of frames includes: After the SDR frame data is switched to the HDR frame data, the display driver module drives the display to display the SDR frame data of the third preset quantity of frames.

It should be noted that, if the type of the picture parameter includes contrast and saturation, in a process of displaying the SDR frame data of the third preset quantity of frames, a contrast difference, a saturation difference, and the switching parameter need to be calculated.

S3055: The dimming interface separately delivers switching amplitudes of a plurality of HDR display effects, a quantity of switching times, and a quantity of frames for each time of switching of the HDR effect to the display driver module.

In the another embodiment of this application, a quantity of switching times of the plurality of HDR display effects and a preset quantity of frames for each time of switching of different HDR effects are the same. For example, the plurality of HDR display effects include contrast and saturation, and a quantity of switching times for contrast and a quantity of switching times for saturation are the same. For example, the quantities of switching times are both a third preset quantity, and a preset quantity of frames for each time of switching of contrast and a preset quantity of frames for each time of switching of saturation are the same, for example, both are a fourth preset quantity of frames.

S3056: Each time frame data of the preset quantity of frames is displayed, the display driver module drives the display to switch the HDR effect once for the frame data based on the switching amplitudes of the plurality of HDR display effects.

In the another embodiment of this application, each time frame data of the fourth quantity of frames is displayed, the display driver module drives the display to adjust contrast of the frame data based on the switching amplitude for contrast and adjust saturation of the frame data based on the switching amplitude for saturation.

S3057: Perform multi-frame switching to display the SDR frame data as the HDR frame data when switching of the HDR display effect reaches the quantity of switching times.

In the another embodiment of this application, when a quantity of times of adjusting the contrast of the frame data based on the switching amplitude for contrast and a quantity of times of adjusting the saturation of the frame data based on the switching amplitude for saturation reach a quantity of times of the third preset quantity, adjustment of the contrast and the saturation is completed.

For example, the quantity of times of the third preset quantity is 5, the fourth preset quantity of frames is 2, and the switching amplitude for saturation is 0.02. The display driver module drives the display to separately increase contrast of displayed two frames of frame data by APL 1% and increase saturation by 0.02 each time the two frames of frame data are displayed, so that when a quantity of frames of displayed frame data reaches 10, both a quantity of times of switching the contrast and a quantity of times of switching the saturation reach 5, and contrast of APL 5% and saturation of 0.1 are increased for the displayed frame data, adjustment of the contrast and adjustment of the saturation are synchronously completed.

Figure 13:
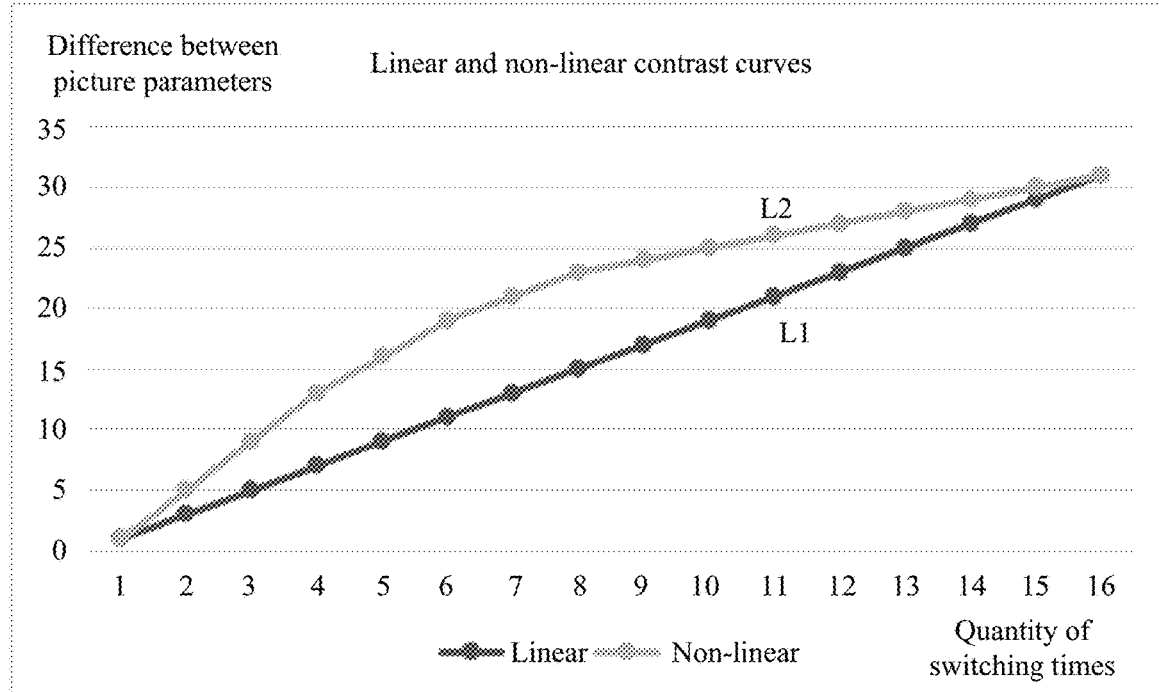
FIG. 13 is a schematic diagram of a curve showing that HDR display effects are superimposed with a quantity of switching times according to an embodiment of this application.

As shown by a curve L1 shown in FIG. 13, in an embodiment of this application, as the quantity of switching times increases, HDR display effects are linearly superimposed. In other words, each time frame data of a preset quantity of frames is displayed, an HDR display effect of the frame data is switched based on a same switching amplitude. In terms of the visual effect of the user, switching of the HDR effect can be continuously perceived.

As shown by a curve L2 shown in FIG. 13, in another embodiment of this application, as the quantity of switching times increases, HDR display effects are non-linearly superimposed. In other words, each time frame data of a preset quantity of frames is displayed, switching amplitudes of the HDR display effects are different.

For example, a superimposing curve of the HDR display effects is close to a Gamma curve of the display, so that switching of the HDR display effect conforms to a characteristic of the display, to optimize the visual effect of the user.

For example, if brightness of ambient light is greater than first preset brightness, that is, the ambient light is bright, in a process of switching the HDR display effect, the switching amplitude of the HDR display effect decreases as the quantity of switching times increases. In this way, in terms of the visual effect of the user, in addition to continuously perceiving switching of the HDR effect, switching of the HDR display effect can be smoother in bright ambient light. Optionally, the first preset brightness is 1000 lux.

For example, if the brightness of the ambient light is less than second preset brightness, that is, the ambient light is dark, in the process of switching the HDR display effect, the switching amplitude of the HDR display effect increases as the quantity of switching times increases. In this way, in terms of the visual effect of the user, in addition to continuously perceiving switching of the HDR effect, switching of the HDR display effect can be smoother in dark ambient light. Optionally, the second preset brightness is 50 lux.

For example, if the ambient light is changed from bright to dark, in the process of switching the HDR display effect, as the quantity of switching times increases, in the bright ambient light, the switching amplitude of the HDR display effect first gradually increases, and when the ambient light changes to darkness, the switching amplitude of the HDR display effect gradually decreases until switching of the HDR display effect is completed. In this way, in terms of the visual effect of the user, in addition to continuously perceiving switching of the HDR effect, switching of the HDR display effect can be smoother when brightness of the ambient light changes.

In an embodiment of this application, to ensure that switching time of the HDR display effects is the same at different screen refresh rates, a quantity of frames of frame data in each time of switching of the HDR effect is set based on the refresh rate. For example, if a refresh rate of the display is 60 Hz, a quantity of frames of HDR frame data in each time of switching of the HDR effect is 1, and the switching time is 16.7 (that is, $\frac{1}{60} \times 1000$) ms. If the refresh rate of the display is 120 Hz, a quantity of frames of HDR frame data in each time of switching of the HDR effect is 2. In this case, the switching time is ($\frac{1}{120} \times 1000$) ms, and the switching time remains unchanged.

Figure 14:
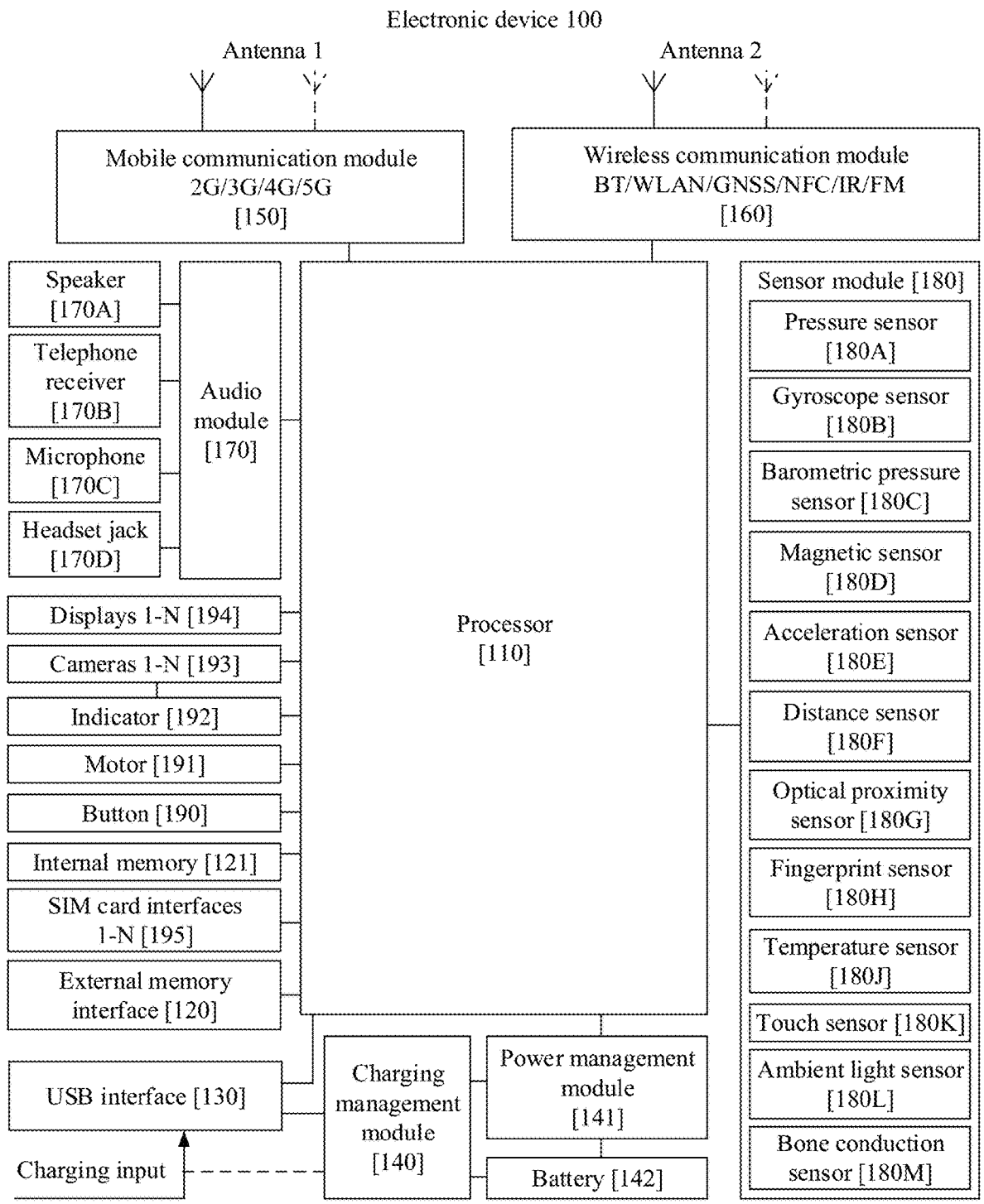
FIG. 14 is a diagram of a hardware architecture of an electronic device according to an embodiment of this application.

As shown in FIG. 14, the electronic device 100 may be a mobile phone, a tablet computer, a desktop computer, a laptop computer, a handheld computer, a notebook computer, an ultra-mobile personal computer (Ultra-mobile Personal Computer, UMPC), a netbook, a cellular phone, a personal digital assistant (Personal Digital Assistant, PDA), an augmented reality (Augmented Reality, AR) device, a virtual reality (Virtual Reality, VR) device, an artificial intelligence (Artificial Intelligence, AI) device, a wearable device, a vehicle-mounted device, a smart home device, and/or a smart city device. A specific type of the electronic device 100 is not specifically limited in this embodiment of this application.

The electronic device 100 may include a processor 110, an external memory interface 120, an internal memory 121, a universal serial bus (Universal Serial Bus, USB) interface 130, a charging management module 140, a power management module 141, a battery 142, an antenna 1, an antenna 2, a mobile communication module 150, a wireless communication module 160, an audio module 170, a speaker 170A, a telephone receiver 170B, a microphone 170C, a headset jack 170D, a sensor module 180, a button 190, a motor 191, an indicator 192, a camera 193, a display 194, a subscriber identification module (Subscriber Identification Module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure illustrated in this embodiment of the present invention does not constitute a specific limitation on the electronic device 100. In some other embodiments of this application, the electronic device 100 may include more or fewer components than those shown in the figure, some components may be combined, some components may be split, or different components may be disposed. The components shown in the figure may be implemented by using hardware, software, or a combination of software and hardware.

The processor 110 may include one or more processing units. For example, the processor 110 may include an application processor (Application Processor, AP), a modem processor, a graphics processing unit (Graphics Processing Unit, GPU), an image signal processor (Image Signal Processor, ISP), a controller, a video codec, a digital signal processor (Digital Signal Processor, DSP), a baseband processor, a neural-network processing unit (Neural-network Processing Unit, NPU), and/or the like. Different processing units may be independent devices, or may be integrated into one or more processors.

The controller may generate an operation control signal based on instruction operation code and a timing signal, to complete control of instruction fetching and instruction execution.

A memory may further be disposed in the processor 110, to store instructions and data. In some embodiments, the memory in the processor 110 is a cache. The memory may store instructions or data that is recently used or cyclically used by the processor 110. If the processor 110 needs to use the instructions or the data again, the processor 110 may directly invoke the instructions or the data from the memory. This avoids repeated access and reduces waiting time of the processor 110, thereby improving system efficiency.

In some embodiments, the processor 110 may include one or more interfaces. The interface may include an inter-integrated circuit (Inter-integrated Circuit, I2C) interface, an inter-integrated circuit sound (Inter-integrated Circuit Sound, I2S) interface, a pulse code modulation (Pulse Code Modulation, PCM) interface, a universal asynchronous receiver/transmitter (universal asynchronous receiver/transmitter, UART) interface, a mobile industry processor interface (Mobile Industry Processor Interface, MIPI), a general-purpose input/output (General-Purpose Input/Output, GPIO) interface, a subscriber identity module (Subscriber Identity Module, SIM) interface, a universal serial bus (Universal Serial Bus, USB) interface, and/or the like.

The I2C interface is a bidirectional synchronous serial bus, including a serial data line (Serial Data Line, SDA) and a serial clock line (Derail Clock Line, SCL). In some embodiments, the processor 110 may include a plurality of groups of I2C buses. The processor 110 may be separately coupled to the touch sensor 180K, a charger, a flashlight, the camera 193, and the like through different I2C bus interfaces. For example, the processor 110 may be coupled to the touch sensor 180K through the I2C interface, so that the processor 110 communicates with the touch sensor 180K through the I2C bus interface, thereby implementing a touch function of the electronic device 100.

The I2S interface may be used for audio communication.

The PCM interface may also be used for audio communication, to sample, quantize, and encode an analog signal.

The UART interface is a universal serial data bus used for asynchronous communication. The bus may be a bidirectional communication bus. The bus converts to-be-transmitted data between serial communication and parallel communication.

The MIPI interface may be configured to connect the processor 110 and peripheral devices such as the display 194 and the camera 193. The MIPI interface includes a camera serial interface (Camera Serial Interface, CSI), a display serial interface (Display Serial Interface, DSI), and the like. In some embodiments, the processor 110 communicates with the display 194 through the DSI interface, to implement a display function of the electronic device 100.

The GPIO interface may be configured through software. The GPIO interface may be configured as a control signal or may be configured as a data signal.

The USB interface 130 is an interface that complies with USB standard specifications, and may be specifically a Mini USB interface, a Micro USB interface, a USB Type C interface, or the like.

It may be understood that an interface connection relationship between modules illustrated in embodiments of the present invention is merely an example for description, and does not constitute a limitation on the structure of the electronic device 100. In some other embodiments of this application, different interface connection manners in the foregoing embodiments or a combination of a plurality of interface connection manners may alternatively be used for the electronic device 100.

The electronic device 100 implements a display function by using a GPU, the display 194, an application processor, and the like. The GPU is a microprocessor for image processing, and is connected to the display 194 and the application processor. The GPU is configured to perform mathematical and geometric calculation, and is configured to render graphics. The processor 110 may include one or more GPUs that execute program instructions to generate or change display information.

The display 194 is configured to display an image, a video, or the like. The display 194 includes a display panel. The display panel may be a liquid crystal display (Liquid Crystal Display, LCD), an organic light-emitting diode (Organic Light-Emitting Diode, OLED), an active-matrix organic light emitting diode (Active-Matrix Organic Light Emitting Diode, AMOLED), a flex light-emitting diode (Flex Light-Emitting Diode, FLED), a Miniled, a Microled, a Micro-OLED, a quantum dot light emitting diode (Quantum Dot Light Emitting Diodes, QLED), or the like. In some embodiments, the electronic device 100 may include one or N displays 194, where N is a positive integer greater than 1.

The digital signal processor is configured to process a digital signal. In addition to processing a digital image signal, the digital signal processor can further process another digital signal. For example, when the electronic device 100 selects a frequency, the digital signal processor is configured to perform Fourier transform on frequency energy.

The internal memory 121 may include one or more random access memories (Random Access Memory, RAM) and one or more non-volatile memories (Non-Volatile Memory, NVM).

The random access memory may include a static random access memory (Static Random-Access Memory, SRAM), a dynamic random access memory (Dynamic Random Access Memory, DRAM), a synchronous dynamic random access memory (Synchronous Dynamic Random Access Memory, SDRAM), a double data rate synchronous dynamic random access memory (Double Data Rate Synchronous Dynamic Random Access Memory, DDR SDRAM, for example, a fifth-generation DDR SDRAM, which is generally referred to as a DDR5 SDRAM), and the like.

The non-volatile memory may include a magnetic disk storage device and a flash memory (flash memory).

The flash memory may be classified, based on an operating principle, into an NOR FLASH, an NAND FLASH, a 3D NAND FLASH, and the like; may be classified, based on a quantity of electric potential levels of a cell, into a single-level cell (Single-Level Cell, SLC), a multi-level cell (Multi-Level Cell, MLC), a triple-level cell (Triple-Level Cell, TLC), a quad-level cell (Quad-Level Cell, QLC), and the like; or may be classified, based on a storage specification, into a universal flash storage (Universal Flash Storage, UFS), an embedded multimedia card (Embedded Multi Media Card, eMMC), and the like.

The random access memory may be directly read and written by the processor 110, and may be configured to store an executable program (for example, a machine instruction) of an operating system or another running program, and may be further configured to store data of a user and data of an application, and the like.

The non-volatile memory may further store the executable program, the data of the user and the application, and the like, which may be loaded into the random access memory in advance for directly reading and writing by the processor 110.

The external memory interface 120 may be configured to connect to an external non-volatile memory, to expand a storage capability of the electronic device 100. The external non-volatile memory communicates with the processor 110 by using the external memory interface 120, to implement a data storage function. For example, files such as music and a video are stored in the external non-volatile memory.

The internal memory 121 or the external memory interface 120 is configured to store one or more computer programs. One or more computer programs are configured to be executed by the processor 110. The one or more computer programs include a plurality of instructions. When the plurality of instructions are executed by the processor 110, the frame data display method performed on the electronic device 100 in the foregoing embodiments may be implemented, to implement a frame data display function of the electronic device 100.

The pressure sensor 180A is configured to sense a pressure signal, and may convert the pressure signal into an electrical signal. In some embodiments, the pressure sensor 180A may be disposed on the display 194. There are many types of pressure sensors 180A, for example, a resistive pressure sensor, an inductive pressure sensor, and a capacitive pressure sensor. The capacitive pressure sensor may include at least two parallel plates having an electrically conductive material. When force is applied onto the pressure sensor 180A, a capacitance between electrodes changes. The electronic device 100 determines strength of pressure based on a change of the capacitance. When a touch operation is performed on the display 194, the electronic device 100 detects intensity of the touch operation by using the pressure sensor 180A. The electronic device 100 may also calculate a touch location based on a detection signal of the pressure sensor 180A. In some embodiments, touch operations acting on the same touch location but with different touch operation intensity may correspond to different operation instructions. For example, when a touch operation whose touch operation intensity is less than a first pressure threshold is performed on an SMS message application icon, an instruction for viewing an SMS message is executed. For example, when a touch operation whose touch operation intensity is greater than or equal to the first pressure threshold is performed on the SMS message application icon, an instruction for creating a new SMS message is executed.

The touch sensor 180K is also referred to as a "touch device". The touch sensor 180K may be disposed on the display 194. The touch sensor 180K and the display 194 form a touchscreen, which is also referred to as "touch screen". The touch sensor 180K is configured to detect a touch operation performed on or near the touch sensor 180K. The touch sensor may transmit the detected touch operation to the application processor, to determine a type of a touch event. A visual output related to the touch operation may be provided by using the display 194. In some other embodiments, the touch sensor 180K may alternatively be disposed on a surface of the electronic device 100, and is at a location different from that of the display 194.

An embodiment further provides a computer storage medium. The computer storage medium stores computer instructions, and when the computer instructions are run on the electronic device 100, the electronic device 100 is enabled to perform the foregoing related method steps to implement the frame data display method in the foregoing embodiments.

An embodiment further provides a computer program product. When the computer program product runs on a computer, the computer is enabled to perform the foregoing related steps to implement the frame data display method in the foregoing embodiments.

In addition, an embodiment of this application further provides an apparatus. The apparatus may be specifically a chip, a component, or a module. The apparatus may include a processor and a memory that are connected. The memory is configured to store computer-executable instructions. When the apparatus runs, the processor may execute the computer-executable instructions stored in the memory, so that the chip performs the frame data display method in the foregoing method embodiments.

The electronic device, the computer storage medium, the computer program product, or the chip provided in embodiments of this application is configured to perform the corresponding method provided above. Therefore, for beneficial effects that can be achieved by the electronic device, the computer storage medium, the computer program product, or the chip, refer to the beneficial effects in the corresponding method provided above. Details are not described herein again.

Through the descriptions of the foregoing implementations, a person skilled in the art may clearly understand that, for the purpose of convenient and brief description, only division of the foregoing functional modules is used as an example for description. In actual application, the functions may be allocated to and completed by different functional modules as required. In other words, an internal structure of the apparatus is divided into different functional modules, to complete all or some of the functions described above.

In several embodiments provided in this application, it should be understood that the disclosed apparatus and method may be implemented in another manner. For example, the described apparatus embodiments are merely examples. For example, division into the modules or units is merely logical function division. In actual implementation, there may be another division manner. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, that is, may be located in one place, or may be distributed in a plurality of different places. Some or all of the units may be selected according to actual requirements to achieve the purpose of the solutions in the embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions in embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods in embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

Finally, it should be noted that the foregoing embodiments are merely used to describe the technical solutions of this application, but are not intended to limit this application. Although this application is described in detail with reference to example embodiments, a person of ordinary skill in the art should understand that modification or equivalent replacement may be performed on the technical solutions of this application without departing from the spirit and scope of the technical solutions of this application.

What is claimed is:

1. A frame data display method, comprising:
  obtaining high-dynamic range (HDR) frame data of standard dynamic range (SDR) frame data in response to an operation instruction generated by switching of a frame data display scenario;
  obtaining picture parameters of the SDR frame data and the HDR frame data;
  calculating a difference between the picture parameter of the SDR frame data and the picture parameter of the HDR frame data;
  dividing the difference into a quantity of equal parts to obtain a switching amplitude of an HDR display effect for each time of switching of a quantity of switching times of the HDR display effect, wherein the quantity of switching times of the HDR display effect is greater than 1, and the quantity of switching times of the HDR display effect is equal to the quantity of equal parts;
  setting a quantity of frames for each time of switching of the quantity of switching times of the HDR display effect; and
  performing multi-frame switching to display the SDR frame data as the HDR frame data through transition based on the switching amplitude of the HDR display effect for each time of switching of the quantity of switching times of the HDR display effect, the quantity of switching times of the HDR display effect, and the quantity of frames for each time of switching of the quantity of switching times of the HDR display effect.

2. The frame data display method according to claim 1, further comprising:
  monitoring, in real time, whether the frame data causes preset display scenario switching; and
  generating the operation instruction when it is detected that the frame data causes the preset display scenario switching.

3. The frame data display method according to claim 2, wherein the preset display scenario switching is to switch the frame data from small-window display to full-screen display or to switch a user interface of a display to a preset application interface.

4. The frame data display method according to claim 1, wherein the obtaining HDR frame data of SDR frame data comprises:
performing dynamic range expansion on the SDR frame data to obtain the HDR frame data.

5. The frame data display method according to claim 4, wherein the performing dynamic range expansion on the SDR frame data to obtain the HDR frame data comprises:
performing inverse hue mapping on the SDR frame data to expand a dynamic range of the SDR frame data, to obtain the HDR frame data.

6. The frame data display method according to claim 4, wherein the performing dynamic range expansion on the SDR frame data to obtain the HDR frame data comprises:
inputting the SDR frame data into a pre-trained dynamic range expansion model, to obtain the HDR frame data.

7. The frame data display method according to claim 1, wherein a type of the picture parameters comprises at least one of contrast, saturation, or hue.

8. The frame data display method according to claim 7, wherein the obtaining picture parameters of the SDR frame data and the HDR frame data comprises:
dividing the SDR frame data and the HDR frame data into a plurality of partitions; and
calculating an average picture level (APL) value of each partition in the SDR frame data and the HDR frame data.

9. The frame data display method according to claim 8, wherein the calculating an APL value of each partition in the SDR frame data and the HDR frame data comprises:
calculating the APL value of each partition based on a grayscale value of each pixel in each partition and a quantity of pixels.

10. The frame data display method according to claim 7, wherein the obtaining picture parameters of the SDR frame data and the HDR frame data comprises:
dividing the SDR frame data and the HDR frame data into a plurality of partitions; and
calculating saturation or hue of each partition in the SDR frame data and the HDR frame data.

11. The frame data display method according to claim 10, wherein the calculating saturation or hue of each partition in the SDR frame data and the HDR frame data comprises:
calculating the saturation or the hue of each partition based on red green blue (RGB) value of each pixel in each partition in the SDR frame data and the HDR frame data.

12. The frame data display method according to claim 8, wherein the calculating a difference between the picture parameter of the SDR frame data and the picture parameter of the HDR frame data comprises:
calculating a difference of at least one type of picture parameter between every two partitions at a same location in the SDR frame data and the HDR frame data; and
determining that a maximum value in a plurality of calculated differences is the difference between the picture parameter of the SDR frame data and the picture parameter of the HDR frame data.

13. The frame data display method according to claim 1, wherein the performing multi-frame switching to display the SDR frame data as HDR frame data through transition based on the switching amplitude of the HDR display effect for each time of switching of the quantity of switching times of the HDR display effect, the quantity of switching times of the HDR display effect, and the quantity of frames for each time of switching of the quantity of switching times of the HDR display effect comprises:
delivering the switching amplitude of the HDR display effect for each time of switching of the quantity of switching times of the HDR display effect, the quantity of switching times of the HDR display effect, and the quantity of frames for each time of switching of the quantity of switching times of the HDR display effect to a display driver module through a dimming interface; and
driving, by the display driver module based on the switching amplitude of the HDR display effect for each time of switching of the quantity of switching times of the HDR display effect, the quantity of switching times of the HDR display effect, and the quantity of frames for each time of switching of the quantity of switching times of the HDR display effect, a display to perform multi-frame switching to display the SDR frame data as the HDR frame data through transition.

14. The frame data display method according to claim 13, wherein the driving, by the display driver module, a display to perform multi-frame switching to display the SDR frame data as the HDR frame data through transition comprises:
for each time of switching of the quantity of switching times of the HDR display effect, each time frame data of the quantity of frames is displayed in the time of switching, driving, by the display driver module, the display to switch the HDR display effect once for the frame data based on the switching amplitude of the HDR display effect for the time of switching; and
wherein the performing multi-frame switching to display the SDR frame data as the HDR frame data is completed when switching of the HDR display effect reaches the quantity of switching times of the HDR display effect.

15. The frame data display method according to claim 13, wherein the driving, by the display driver module, a display to perform multi-frame switching to display the SDR frame data as the HDR frame data through transition comprises:
when there are at least two types of picture parameters, displaying SDR frame data of a preset quantity of frames;
separately delivering, by the dimming interface, switching amplitudes of a plurality of HDR display effects for each time of switching of the quantity of switching times of the HDR display effect, the quantity of switching times of the HDR display effect, and the quantity of frames for each time of switching of the quantity of switching times of the HDR display effect to the display driver module;
for each time of switching of the quantity of switching times of the HDR display effect, each time frame data of the quantity of frames is displayed in the time of switching, driving, by the display driver module, the display to switch the HDR display effect once for the frame data based on the switching amplitudes of the plurality of HDR display effects; and
wherein the performing multi-frame switching to display the SDR frame data as the HDR frame data is completed when switching of the HDR display effect reaches the quantity of switching times of the HDR display effect.

16. The frame data display method according to claim 13, wherein the driving, by the display driver module, a display to perform multi-frame switching to display the SDR frame data as the HDR frame data through transition comprises:

driving, by the display driver module based on the switching amplitude of the HDR display effect for each time of switching of the quantity of switching times of the HDR display effect, the quantity of switching times of the HDR display effect, and the quantity of frames for each time of switching of the HDR display effect, the display to perform multi-frame switching to perform linear adjustment or non-linear adjustment on the picture parameter of the SDR frame data, to display the SDR frame data as the HDR frame data.

17. An electronic device, wherein the electronic device comprises a memory and a processor;
the memory is configured to store program instructions; and
the processor is configured to read and execute the program instructions stored in the memory, and when the program instructions are executed by the processor, the electronic device is enabled to:
obtain high-dynamic range (HDR) frame data of standard dynamic range (SDR) frame data in response to an operation instruction generated by switching of a frame data display scenario;
obtain picture parameters of the SDR frame data and the HDR frame data;
calculate a difference between the picture parameter of the SDR frame data and the picture parameter of the HDR frame data;
divide the difference into a quantity of equal parts to obtain a switching amplitude of an HDR display effect for each time of switching of a quantity of switching times of the HDR display effect, wherein the quantity of switching times of the HDR display effect is greater than 1, and the quantity of switching times of the HDR display effect is equal to the quantity of equal parts;
set a quantity of frames for each time of switching of the quantity of switching times of the HDR display effect; and
perform multi-frame switching to display the SDR frame data as the HDR frame data through transition based on the switching amplitude of the HDR display effect for each time of switching of the quantity of switching times of the HDR display effect, the quantity of switching times of the HDR display effect, and the quantity of frames for each time of switching of the quantity of switching times of the HDR display effect.

18. The electronic device according to claim 17, wherein when the program instructions are executed by the processor, the electronic device is further enabled to:
monitor, in real time, whether the frame data causes preset display scenario switching; and
generate the operation instruction when it is detected that the frame data causes the preset display scenario switching.

19. A non-transitory computer storage medium, wherein the non-transitory computer storage medium stores program instructions, and when the program instructions are run on an electronic device, the electronic device is enabled to:
obtain high-dynamic range (HDR) frame data of standard dynamic range (SDR) frame data in response to an operation instruction generated by switching of a frame data display scenario;
obtain picture parameters of the SDR frame data and the HDR frame data;
calculate a difference between the picture parameter of the SDR frame data and the picture parameter of the HDR frame data;
divide the difference into a quantity of equal parts to obtain a switching amplitude of an HDR display effect for each time of switching of a quantity of switching times of the HDR display effect, wherein the quantity of switching times of the HDR display effect is greater than 1, and the quantity of switching times of the HDR display effect is equal to the quantity of equal parts;
set a quantity of frames for each time of switching of the quantity of switching times of the HDR display effect; and
perform multi-frame switching to display the SDR frame data as the HDR frame data through transition based on the switching amplitude of the HDR display effect for each time of switching of the quantity of switching times of the HDR display effect, the quantity of switching times of the HDR display effect, and the quantity of frames for each time of switching of the quantity of switching times of the HDR display effect.

20. The non-transitory computer storage medium according to claim 19, wherein when the program instructions are run on the electronic device, the electronic device is further enabled to:
monitor, in real time, whether the frame data causes preset display scenario switching; and
generate the operation instruction when it is detected that the frame data causes the preset display scenario switching.

* * * * *